US012626654B2

(12) United States Patent
Zhang

(10) Patent No.: US 12,626,654 B2

(45) **Date of Patent: *May 12, 2026**

(54) DISPLAY DEVICE AND GATE DRIVE UNIT COMPRISING FREQUENCY-DIVISION CONTROL MODULE

(71) Applicant: WUHAN CHINA STAR OPTOELECTRONICS SEMICONDUCTOR DISPLAY TECHNOLOGY CO., LTD., Wuhan (CN)

(72) Inventor: Huanxi Zhang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 107 days.

This patent is subject to a terminal disclaimer.

(21) Appl. No.: 18/695,691

(22) PCT Filed: Dec. 29, 2023

(86) PCT No.: PCT/CN2023/143365

§ 371 (c)(1),
(2) Date: Mar. 26, 2024

(87) PCT Pub. No.: WO2025/138144

PCT Pub. Date: Jul. 3, 2025

(65) Prior Publication Data

US 2025/0209979 A1 Jun. 26, 2025

(30) Foreign Application Priority Data

Dec. 26, 2023 (CN) ......................... 202311814730.0

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0819* (2013.01);
(Continued)

(58) Field of Classification Search
CPC ................... G09G 3/3233; G09G 3/32; G09G 2300/0819; G09G 2300/0852;
(Continued)

(56) References Cited

U.S. PATENT DOCUMENTS

2021/0035489 A1* 2/2021 Seo .......................... G09G 3/22
2022/0044620 A1* 2/2022 Seo ...................... G09G 3/2092
(Continued)

*Primary Examiner* — Nathan P Brittingham

(74) *Attorney, Agent, or Firm* — HSML P.C.

(57) ABSTRACT

A gate drive unit and a display device in which a plurality of cascaded gate drive circuits are electrically connected to a frequency-division control line configured to transmit a frequency-division control signal, so that a frequency-division control module in each gate drive circuit controls signal transmission between a first power supply terminal and a first node or a second node according to the frequency-division control signal, thereby controlling level states of gate control signals outputted by a first output module and a second output module.

16 Claims, 13 Drawing Sheets

(52) U.S. Cl.
CPC ............... *G09G 2300/0852* (2013.01); *G09G 2310/0267* (2013.01); *G09G 2310/061* (2013.01); *G09G 2310/08* (2013.01); *G09G 2320/045* (2013.01); *G09G 2330/021* (2013.01)

(58) Field of Classification Search
CPC ..... G09G 2310/0267; G09G 2310/061; G09G 2310/08; G09G 2320/045; G09G 2330/021
See application file for complete search history.

(56) References Cited

U.S. PATENT DOCUMENTS

| | | | | |
|---|---|---|---|---|
| 2022/0076618 | A1* | 3/2022 | Lai | G09G 3/3266 |
| 2023/0073348 | A1* | 3/2023 | Yoon | G09G 3/3266 |
| 2024/0153424 | A1* | 5/2024 | Kim | G11C 19/28 |

* cited by examiner

DISPLAY DEVICE AND GATE DRIVE UNIT COMPRISING FREQUENCY-DIVISION CONTROL MODULE

CROSS REFERENCE TO RELATED APPLICATIONS

This application is a US national phase application based upon an International Application No. PCT/CN2023/143365, filed on Dec. 29, 2023, and entitled "GATE DRIVE UNIT AND DISPLAY DEVICE", which claims priority to Chinese Patent Application No. 202311814730.0, filed on Dec. 26, 2023, and entitled "GATE DRIVE UNIT AND DISPLAY DEVICE", the contents of which are incorporated herein by reference in their entireties.

TECHNICAL FIELD

The present disclosure relates to the field of display technologies, and more particularly, to a gate drive unit and a display device.

BACKGROUND

The adoption of a variable refresh rate design can reduce power consumption of a display panel. However, in some use scenarios, the display panel corresponds to different display regions with different display screen contents. If different display regions are still driven to display different display screens by employing a same refresh rate, the region(s) for displaying the static screen(s) and the region(s) for displaying the dynamic screen(s) are driven by employing the same refresh rate, which may cause resource waste.

SUMMARY

An embodiment of the present disclosure provides a gate drive circuit and a display device, which may realize region-partition frequency-division driving.

An embodiment of the present disclosure provides a gate drive unit including a frequency-division control line and a plurality of cascaded gate drive circuits, the frequency-division control line configured to transmit a frequency-division control signal to the plurality of gate drive circuits. Each of the gate drive circuits includes a first control module, a first output module, a second output module, and a frequency-division control module. The first control module is electrically connected to a first node of a current-stage gate drive circuit, and the first control module is configured to control signal transmission between the first node and one of a first power supply terminal and a second power supply terminal according to a corresponding first clock signal and one of a start signal and a first gate control signal outputted by a previous-stage gate drive circuit. The first output module is electrically connected to at least the first node of the current-stage gate drive circuit, the first output module is configured to control an electrical connection between a third power supply terminal and a first output terminal of the current-stage gate drive circuit according to a potential of the first node, and the first output terminal outputs a first gate control signal of the current-stage gate drive circuit. The second output module is electrically connected to a second node of the current-stage gate drive circuit and a third node of the current-stage gate drive circuit, and the second output module is configured to output a second gate control signal of the current-stage gate drive circuit according to a potential of the second node and a potential of the third node. The frequency-division control module is electrically connected to the first node of the current-stage gate drive circuit, and the frequency-division control module is configured to control signal transmission between the first power supply terminal and the first node or the second node according to the frequency-division control signal.

An embodiment of the present disclosure further provides a display device including the gate drive unit as described above and a display panel. The display panel includes a plurality of sub-pixels, each sub-pixel including a light-emitting device and a pixel drive circuit for driving the light-emitting device to emit light, the pixel drive circuit including at least a drive transistor, a data transistor and a compensation transistor. The drive transistor is configured to drive the light-emitting device to emit light according to a corresponding data signal, an input terminal of the compensation transistor is electrically connected to an output terminal of the drive transistor, an output terminal of the compensation transistor is electrically connected to a control terminal of the drive transistor, an input terminal of the data transistor is configured to receive the corresponding data signal, and an output terminal of the data transistor is electrically connected to an input terminal of the drive transistor. Wherein the first gate control signals generated by the plurality of gate drive circuits are outputted to the control terminals of the compensation transistors of the plurality of sub-pixels, and the second gate control signals generated by the plurality of gate drive circuits are outputted to control terminals of the data transistors of the plurality of sub-pixels.

DETAILED DESCRIPTION

In order to make the purpose, technical solutions and effects of the present disclosure clearer and more explicit, the present disclosure will be further described in detail below with reference to the accompanying drawings and by way of embodiments. It should be understood that the specific embodiments described here are only used to explain the present disclosure and are not used to limit the present disclosure.

According to the gate drive unit and the display device provided in the embodiments of the present disclosure, a plurality of cascaded gate drive circuits are electrically connected to a frequency-division control line for transmitting a frequency-division control signal, so that a frequency-division control module in each gate drive circuit controls signal transmission between a first power supply terminal and a first node or a second node according to the frequency-division control signal, thereby controlling level states of gate control signals outputted by the first output module and the second output module, so that gate control signals outputted by at least one of the gate drive circuits always maintain in inactive level states. When the gate drive unit is used in the display device, control of the level states of the gate control signals outputted by the plurality of gate drive circuits are implemented by the frequency-division control signal, so that the display panel realizes frequency-division region-partition control.

Figure 1A:
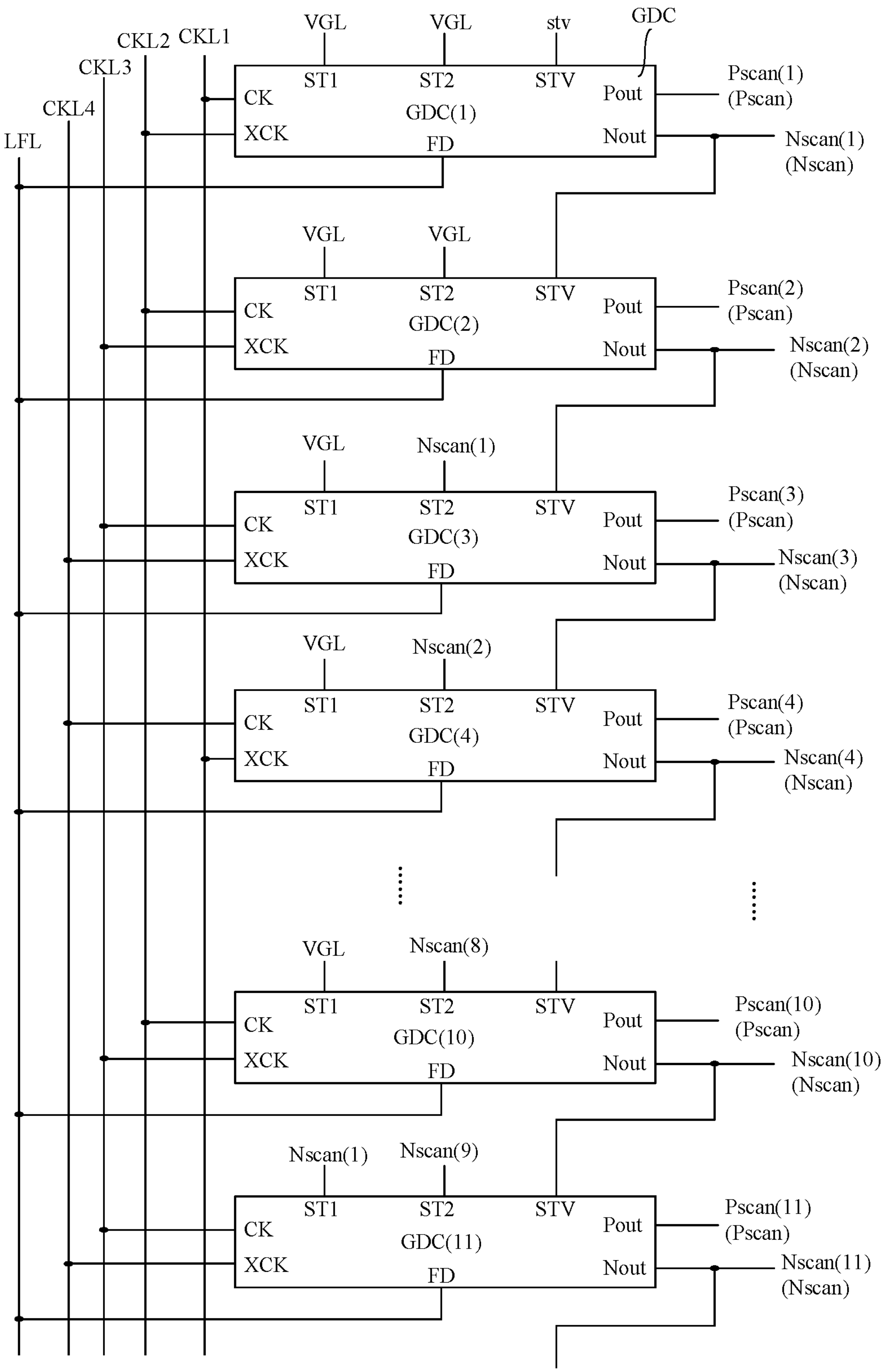
FIGS. 1A-1B are schematic structural diagrams of a gate drive unit according to an embodiment of the present disclosure.
Figure 1B:
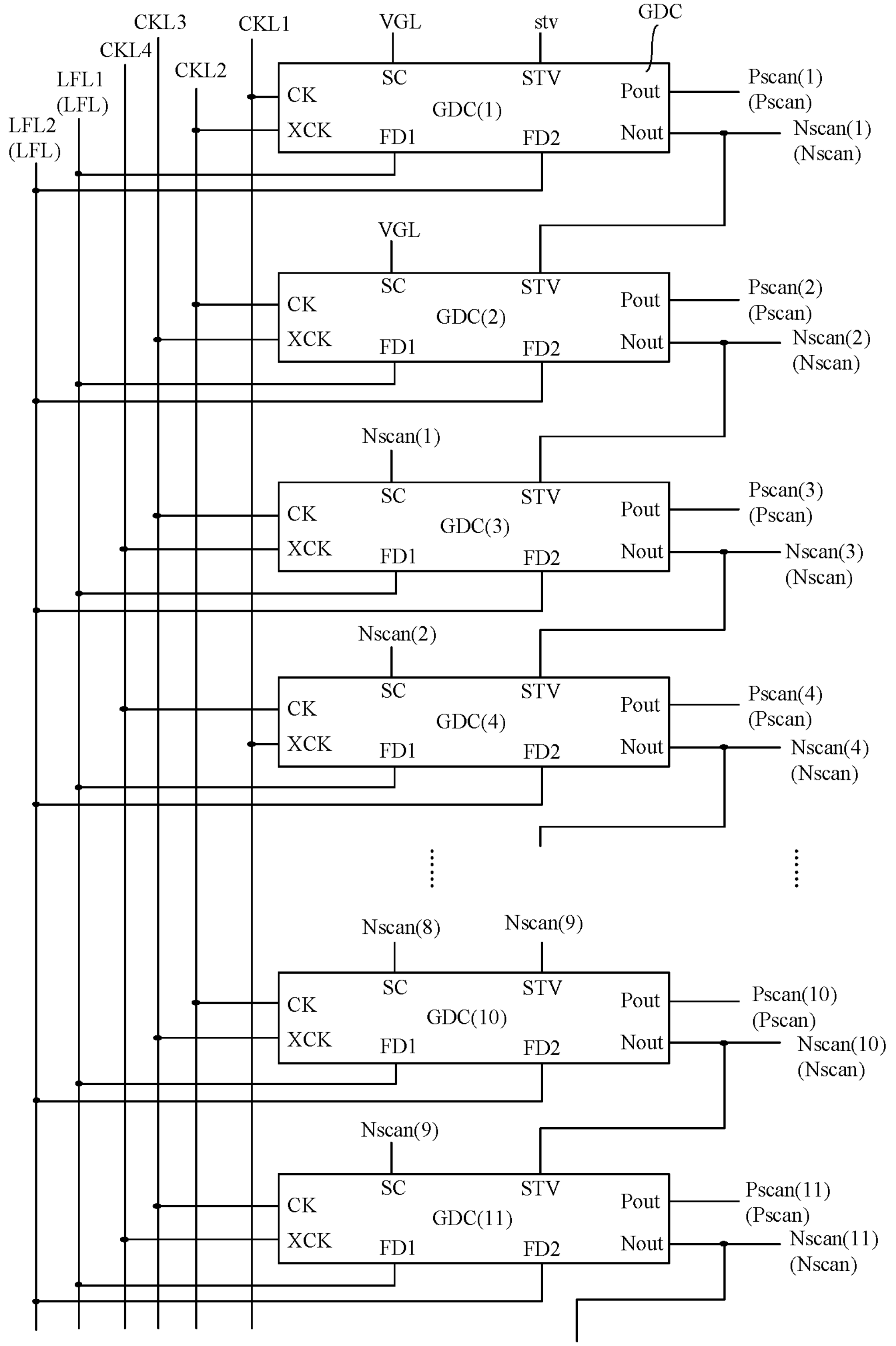

Specifically, FIGS. 1A-1B are schematic structural diagrams of a gate drive unit according to an embodiment of the present disclosure. The present disclosure provides a gate drive unit including a frequency-division control line LFL and a plurality of cascaded gate drive circuits GDC, the plurality of cascaded gate drive circuits GDC being electrically connected to the frequency-division control line LFL, the frequency-division control line LFL being configured to transmit a frequency-division control signal FD to the plurality of gate drive circuits GDC.

Still referring to FIGS. 1A-1B, the gate drive unit is electrically connected to a plurality of clock lines, and the plurality of clock lines provide a first clock signal XCK and a second clock signal CK required for the plurality of gate drive circuits GDC so that the plurality of gate drive circuits GDC share clock signals transmitted through the plurality of clock lines, thereby reducing the number of clock signals applied to the gate drive unit, and reducing the number of clock signal lines and wiring space occupied by the clock signal lines.

Optionally, the plurality of clock lines includes a first clock line CKL1 to a fourth clock line CKL4. A first clock signal XCK corresponding to a (4x+1)th-stage gate drive circuit GDC(4x+1) is provided by a second clock line CKL2, and a second clock signal CK corresponding to the (4x+1)th-stage gate drive circuit GDC(4x+1) is provided by the first clock line CKL1; a first clock signal XCK corresponding to a (4x+2)th-stage gate drive circuit GDC(4x+2) is provided by a third clock line CKL3, and a second clock signal CK corresponding to the (4x+2)th-stage gate drive circuit GDC(4x+2) is provided by the second clock line CKL2; a first clock signal XCK corresponding to a (4x+3)th-stage gate drive circuit GDC(4x+3) is provided by the fourth clock line CKL4, and a second clock signal CK corresponding to the (4x+3)th-stage gate drive circuit GDC (4x+3) is provided by the third clock line CKL3; a first clock signal XCK corresponding to a (4x+4)th-stage gate drive circuit GDC(4x+4) is provided by the first clock line CKL1, and a second clock signal CK corresponding to the (4x+4)th-stage gate drive circuit GDC(4x+4) is provided by the fourth clock line CKL4. Wherein, x≥0.

FIGS. 2A-2D are circuit diagrams of a gate drive circuit according to an embodiment of the present disclosure, and an nth-stage gate drive circuit GDC(n) is taken as an example for explanation. Wherein, Nout(n) denotes a first output terminal of the nth-stage gate drive circuit GDC(n), Pout(n) denotes a second output terminal of the nth-stage gate drive circuit GDC(n), and P(n) denotes a third node of the nth-stage gate drive circuit GDC(n).

Each gate drive circuit GDC includes a first control module 10, a second control module 20, a first output module 30, a second output module 40, and a frequency-division control module 50.

The first control module 10 is electrically connected to a first node K1 of a current-stage gate drive circuit GDC, and the first control module 10 is configured to control signal transmission between one of a first power supply terminal PVGL and a second power supply terminal PVGH and the first node K1 according to a corresponding first clock signal XCK and an activation signal STV.

Optionally, a first-stage gate drive circuit GDC of the plurality of gate drive circuits GDC takes a start signal stv as the activation signal STV so that the first-stage gate drive circuit GDC(1) controls the signal transmission between one of the first power supply terminal PVGL and the second power supply terminal PVGH and the first node K1 of the first-stage gate drive circuit GDC(1) according to the corresponding first clock signal XCK and the start signal stv.

Optionally, an nth-stage gate drive circuit GDC(n) of the plurality of gate drive circuits GDC takes an (n−A)th-stage first gate control signal Nscan(n−A) outputted by an (n−A) th-stage gate drive circuit GDC(n−A) as the activation signal STV, so that the nth-stage gate drive circuit GDC(n) controls the signal transmission between one of the first power supply terminal PVGL and the second power supply terminal PVGH and the first node K1 of the nth-stage gate drive circuit GDC(n) according to the corresponding first clock signal XCK and the (n−A)th-stage first gate control signal Nscan(n−A) outputted by the (n−A)th-stage gate drive circuit GDC(n−A). Wherein, n>1, A≥1.

Optionally, to reduce the load(s) corresponding to the first output terminal(s) Nout of the gate drive circuit(s) GDC, the nth-stage gate drive circuit GDC(n) of the plurality of gate drive circuits GDC controls the signal transmission between one of the first power supply terminal PVGL and the second power supply terminal PVGH and the first node K1 of the nth-stage gate drive circuit GDC(n) according to the corresponding first clock signal XCK and a potential of the third node P of the (n−A)th-stage gate drive circuit GDC(n−A).

Optionally, with continued reference to FIGS. 2A-2D, the first control module 10 includes a first transistor T1, a second transistor T2, and a third transistor T3.

A first control terminal and a second control terminal of the first transistor T1 are configured to receive the activation signal STV, and an input terminal of the first transistor T1 is electrically connected to the first power supply terminal PVGL.

A control terminal of the second transistor T2 is electrically connected to the first control terminal of the first transistor T1, an input terminal of the second transistor T2 is electrically connected to the second power supply terminal PVGH, and an output terminal of the second transistor T2 is electrically connected to the output terminal of the first transistor T1.

A control terminal of the third transistor T3 is configured to receive a corresponding first clock signal XCK, an input terminal of the third transistor T3 is electrically connected to the output terminal of the first transistor T1, and an output terminal of the third transistor T3 is electrically connected to the first node K1.

Optionally, the first control module 10 is also electrically connected to the third node P of the current-stage gate drive circuit GDC, and the first control module 10 is configured to control an electrical connection between the second power supply terminal PVGH or a third power supply terminal NVGL and the first node K1 according to a potential of the third node P.

Optionally, with continued reference to FIGS. 2A-2D, the first control module 10 includes a fourth transistor T4, a fifth transistor T5, and a sixth transistor T6.

A first control terminal and a second control terminal of the fourth transistor T4 are configured to receive a corresponding first clock signal XCK, and an output terminal of the fourth transistor T4 is electrically connected to the first node K1. A control terminal of the fifth transistor T5 and a first control terminal and a second control terminal of the sixth transistor T6 are electrically connected to the third node P, an input terminal of the fifth transistor T5 is electrically connected to the second power supply terminal PVGH, an output terminal of the fifth transistor T5 is electrically connected to an input terminal of the fourth transistor T4, an input terminal of the sixth transistor T6 is electrically connected to the third power supply terminal NVGL, and an output terminal of the sixth transistor T6 is electrically connected to the first node K1.

Still referring to FIGS. 2A-2D, the second control module 20 is electrically connected to the first node K1 of the current-stage gate drive circuit GDC and the third node P of the current-stage gate drive circuit GDC. The second control module 20 is configured to control signal transmission between the first power supply terminal PVGL or the second power supply terminal PVGH and the third node P according to the potential of the first node K1.

Optionally, with continued reference to FIGS. 2A-2D, the gate drive unit further includes a seventh transistor T7 and an eighth transistor T8.

A first control terminal and a second control terminal of the seventh transistor T7 are electrically connected to the first node K1, an input terminal of the seventh transistor T7 is electrically connected to the first power supply terminal PVGL, an output terminal of the seventh transistor T7 is electrically connected to the third node P, a control terminal of the eighth transistor T8 is electrically connected to the first node K1, an input terminal of the eighth transistor T8 is electrically connected to the second power supply terminal PVGH, and an output terminal of the eighth transistor T8 is electrically connected to the third node P.

Still referring to FIGS. 2A-2D, the first output module 30 is electrically connected to at least the first node K1 of the current-stage gate drive circuit GDC. The first output module 30 is configured to control an electrical connection between the third power supply terminal NVGL and the first output terminal Nout of the current-stage gate drive circuit GDC according to the potential of the first node K1. The first output terminal Nout outputs a first gate control signal Nscan of the current-stage gate drive circuit GDC.

The second output module 40 is electrically connected to a second node K2 of the current-stage gate drive circuit GDC and the third node P of the current-stage gate drive circuit GDC. The second output module 40 is configured to output a second gate control signal Pscan of the current-stage gate drive circuit GDC according to a potential of the second node K2 and the potential of the third node P.

The frequency-division control module 50 is electrically connected to the first node K1 of the current-stage gate drive circuit GDC, and the frequency-division control module 50 is configured to control signal transmission between the first power supply terminal PVGL and the first node K1 or the second node K2 according to the frequency-division control signal LF.

By setting the frequency-division control module 50, each gate drive circuit GDC may control the level states of the first gate control signal Nscan and the second gate control signal Pscan according to the frequency-division control signal LF, so that when the gate drive unit is used in the display device, the levels of the first gate control signal(s) Nscan and the second gate control signal(s) Pscan outputted by the corresponding gate drive circuit(s) GDC are controlled to maintain in an inactive level state, thereby enabling the display panel to realize frequency-division region-partition control.

Since each gate drive circuit GDC may output the first gate control signal Nscan and the second gate control signal Pscan at the same time, control of the level states of the first gate control signal Nscan and the second gate control signal Pscan may be implemented by employing a same frequency-division control signal LF, or control of the level states of the first gate control signal Nscan and the second gate control signal Pscan may be implemented by employing two frequency-division control signals LF, respectively.

Accordingly, as shown in FIG. 1A, the plurality of gate drive circuits GDC are electrically connected to a same frequency-division control line LFL to implement control of the level states of the first gate control signals Nscan and the second gate control signals Pscan outputted by the plurality of gate drive circuits GDC through the frequency-division control signal LF transmitted through the frequency-division control line LFL. As shown in FIG. 1B, there are frequency-division control lines LFL including a first frequency-division control line LFL1 and a second frequency-division control line LFL2, and the plurality of gate drive circuits GDC are electrically connected to the first frequency-division control line LFL1 and the second frequency-division control line LFL2 so as to implement control of the level states of the first gate control signals Nscan and the second gate control signals Pscan outputted by the plurality of gate drive circuits GDC through a first frequency-division control signal NLF transmitted through the first frequency-division control line LFL1 and a second frequency-division control signal PLF transmitted through the second frequency-division control line LFL2.

The following first describes the circuit structure of the gate drive circuit GDC by taking multiple gate drive circuits GDC controlled by a same frequency-division control line LFL as an example. Still referring to FIGS. 2A-2C, the frequency-division control module 50 is electrically connected to the first control module 10, and the frequency-division control module 50 controls signal transmission between the first power supply terminal PVGL and the first node K1 according to the frequency-division control signal LF.

Optionally, the frequency-division control module 50 is electrically connected to the first transistor T1 or the third transistor T3 to realize electrical connection with the first control module 10.

Figure 2A:
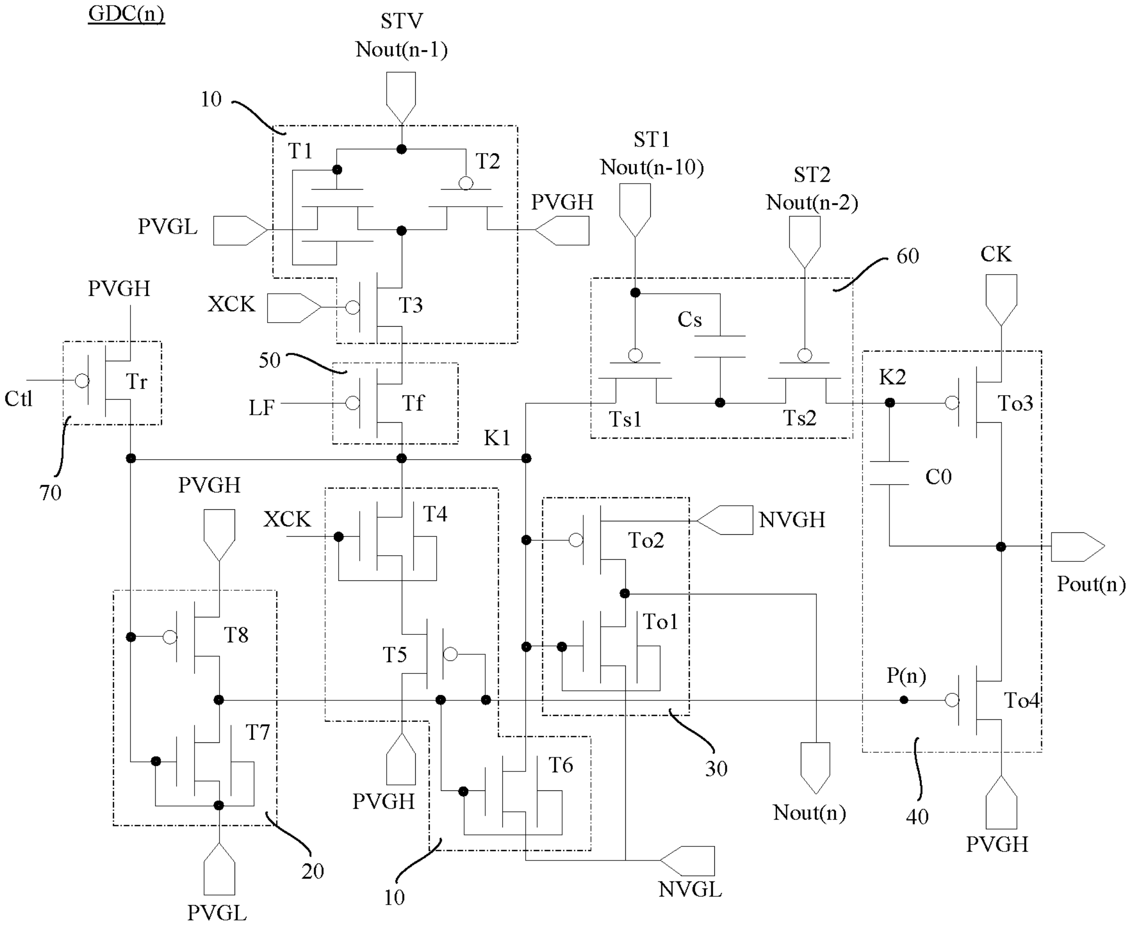
FIGS. 2A-2D are circuit diagrams of a gate drive circuit according to an embodiment of the present disclosure.

Optionally, referring to FIG. 2A, the frequency-division control module 50 includes a frequency-division transistor Tf, a control terminal of the frequency-division transistor Tf is configured to receive the frequency-division control signal LF, an input terminal of the frequency-division transistor Tf is electrically connected to the output terminal of the third transistor T3, and an output terminal of the frequency-division transistor Tf is electrically connected to the first node K1. The frequency-division transistor Tf is configured to control signal transmission between the first node K1 and the output terminal of the third transistor T3 according to the frequency-division control signal LF to disconnect signal transmission between the first node K1 and the first power supply terminal PVGL when the frequency-division transistor Tf is turned off. When the frequency-division transistor Tf is turned on, an electrical connection between the first node K1 and the output terminal of the third transistor T3 is realized, so that there is signal transmission between the first power supply terminal PVGL and the first node K1, thereby implementing control of the signal transmission between the first node K1 and the first power supply terminal PVGL.

Figure 2B:
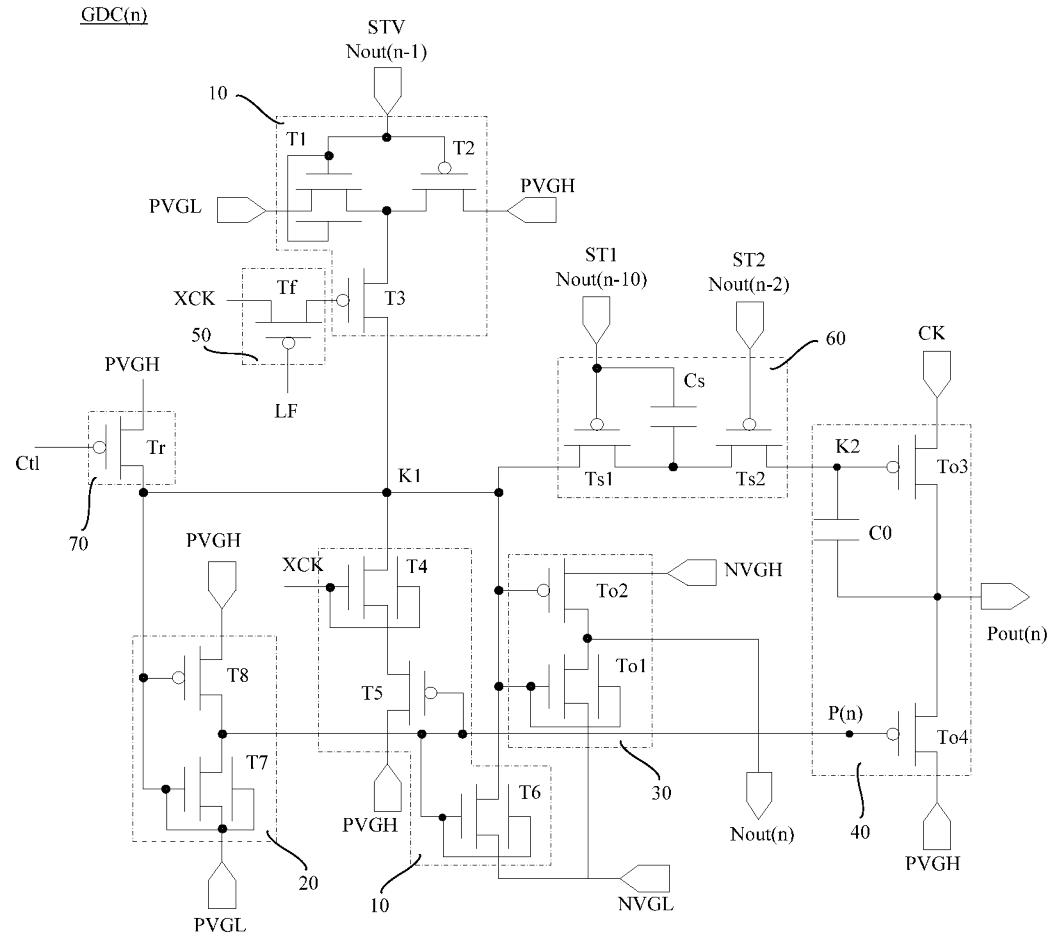

Optionally, with continued reference to FIG. 2B, the frequency-division control module 50 includes a frequency-division transistor Tf, a control terminal of the frequency-division transistor Tf is configured to receive the frequency-division control signal LF, an input terminal of the frequency-division transistor Tf is configured to receive a corresponding first clock signal XCK, and an output terminal of the frequency-division transistor Tf is electrically connected to the control terminal of the third transistor T3. The frequency-division transistor Tf is configured to control an on-off condition of the third transistor T3 according to the frequency-division control signal LF so as to implement control of signal transmission between the first node K1 and the first power supply terminal PVGL.

Figure 2C:
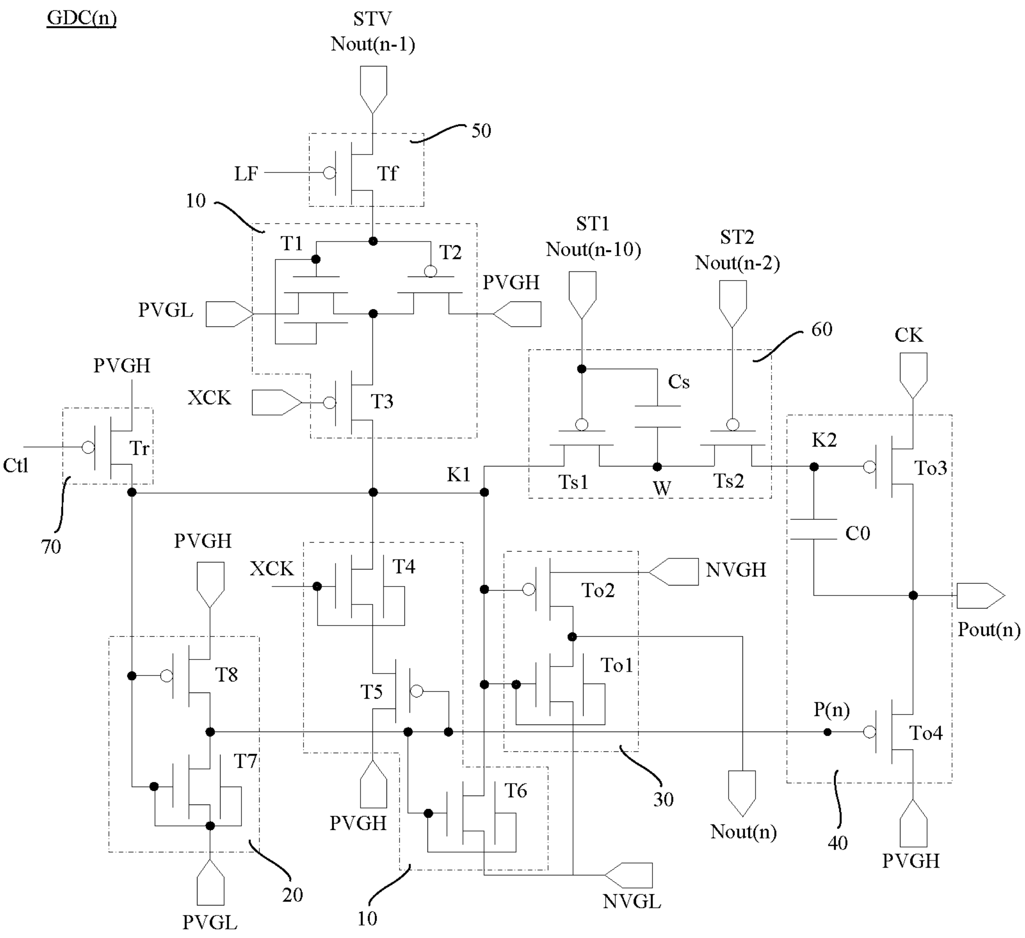

Optionally, with continued reference to FIG. 2C, the frequency-division control module 50 includes a frequency-division transistor Tf, a control terminal of the frequency-division transistor Tf is configured to receive the frequency-division control signal LF, an input terminal of the frequency-division transistor Tf is configured to receive the start signal stv or the first gate control signal Nscan outputted by a previous-stage gate drive circuit GDC, and an output terminal of the frequency-division transistor Tf is electrically connected to the first control terminal of the first transistor T1. The frequency-division transistor Tf is configured to control on-off conditions of the first transistor T1 and the second transistor T2 according to the frequency-division control signal LF, thereby implementing control of signal transmission between the first node K1 and the first power supply terminal PVGL.

Still referring to FIGS. 2A-2C, the first output module 30 is configured to control signal transmission between the third power supply terminal NVGL or a fourth power supply terminal NVGH and the first output terminal Nout according to a potential of the first node K1.

Optionally, the first output module 30 includes a first output transistor To1 and a second output transistor To2.

A first control terminal, a second control terminal of the first output transistor To1 and a control terminal of the second output transistor To2 are electrically connected to the first node K1, an input terminal of the first output transistor To1 is electrically connected to the third power supply terminal NVGL, an input terminal of the second output transistor To2 is electrically connected to the fourth power supply terminal NVGH, and an output terminal of the second output transistor To2 and an output terminal of the first output transistor To1 are electrically connected to the first output terminal Nout of the current-stage gate drive circuit GDC.

Optionally, the second output module 40 includes a third output transistor To3, a fourth output transistor To4, and a storage capacitor C0.

A control terminal of the third output transistor To3 is electrically connected to the second node K2, an input terminal of the third output transistor To3 is configured to receive a corresponding second clock signal CK, a control terminal of the fourth output transistor To4 is electrically connected to the third node P of the current-stage gate drive circuit GDC, an input terminal of the fourth output transistor To4 is electrically connected to the second power supply terminal PVGH, and an output terminal of the fourth output transistor To4 and an output terminal of the third output transistor To3 are electrically connected to the second output terminal Pout of the current-stage gate drive circuit GDC.

A first terminal of the storage capacitor C0 is electrically connected to the control terminal of the third output transistor To3, and a second terminal of the storage capacitor C0 is electrically connected to the second output terminal Pout of the current-stage gate drive circuit GDC.

Optionally, each gate drive circuit GDC further includes an output control module 60 electrically connected to the first node K1 and the second node K2, the output control module 60 being configured to control signal transmission between the first node K1 and the second node K2 according to an output control signal ST.

Optionally, with continued reference to FIGS. 2A and 2C, the output control module 60 includes a first switching transistor Ts1, a second switching transistor Ts2, and a third capacitor Cs.

An input terminal of the first switching transistor Ts1 is electrically connected to the first node K1, an input terminal of the second switching transistor Ts2 is electrically connected to an output terminal of the first switching transistor Ts1, and an output terminal of the second switching transistor Ts2 is electrically connected to the second node K2.

A first terminal of the third capacitor Cs is electrically connected to a control terminal of the first switching transistor Ts1, and a second terminal of the third capacitor Cs is electrically connected to the output terminal of the first switching transistor Ts1.

Wherein the control terminal of the first switching transistor Ts1 is configured to receive a first output control signal ST1, and a control terminal of the second switching transistor Ts2 is configured to receive a second output control signal ST2, and there are output control signals ST including the first output control signal ST1 and the second output control signal ST2.

Optionally, the control terminal of the first switching transistor Ts1 of the nth-stage gate drive circuit GDC(n) is configured to receive the (n−B)th-stage first gate control signal Nscan(n−B) outputted by the (n−B)th-stage gate drive circuit GDC(n−B) as the first output control signal ST1, and the control terminal of the second switching transistor Ts2 of the nth-stage gate drive circuit GDC(n) is configured to receive the (n−C)th-stage first gate control signal Nscan(n−C) outputted by the (n−C)th-stage gate drive circuit GDC (n−C) as the second output control signal ST2. Wherein, B>0, C>0.

Optionally, to reduce the load(s) of the gate drive circuit (s) GDC, the control terminal of the first switching transistor Ts1 of the nth-stage gate drive circuit GDC(n) is electrically connected to the third node P(n−B) of the (n−B)th-stage gate drive circuit GDC(n−B) so that the first switching transistor Ts1 of the nth-stage gate drive circuit GDC(n) is turned on or off according to the potential of the third node P of the (n−B)th-stage gate drive circuit GDC(n−B) (i.e., corresponding to the first output control signal ST1). The control terminal of the second switching transistor Ts2 of the nth-stage gate drive circuit GDC(n) is electrically connected to the third node P(n−C) of the (n−C)th-stage gate drive circuit GDC(n−C) so that the second switching transistor Ts2 of the nth-stage gate drive circuit GDC(n) is turned on or off according to the potential of the third node P of the (n−C)th-stage gate drive circuit GDC(n−C) (i.e., corresponding to the second output control signal ST2).

Optionally, in some embodiments, A=1, B=10, C=2 such that a pulse width of an active pulse of the first gate control signal Nscan is greater than a pulse width of an active pulse of the second gate control signal Pscan.

Accordingly, the control terminal of the second transistor T2 of the first-stage gate drive circuit GDC(1) is configured to receive the start signal stv, and the control terminal of the second transistor T2 of the gate drive circuit GDC at each stage located after the first-stage gate drive circuit GDC(1) is configured to receive the first gate control signal Nscan outputted by a previous-stage gate drive circuit GDC (for example, the control terminal of the second transistor T2 of the nth-stage gate drive circuit GDC(n) is configured to receive the first gate control signal Nscan(n−1) outputted by the (n−1)th-stage gate drive circuit GDC(n−1)). The first output control signals ST1 received at the control terminals of the first switching transistors Ts1 of the first-stage gate drive circuit GDC(1) to the tenth-stage gate drive circuit GDC(10) correspond to low-level signals VGL. The control terminal of the first switching transistor Ts1 of the gate drive circuit at each stage located after the tenth-stage gate drive circuit GDC(10) is configured to receive a first gate control signal Nscan outputted by a ten-stage-preceding gate drive circuit (e.g., the control terminal of the first switching transistor Ts1 of the nth-stage gate drive circuit GDC(n) is configured to receive the (n−10)th-stage first gate control signal Nscan(n−10) outputted by the (n−10)th-stage gate drive circuit GDC(n−10)). The second output control signals ST2 received at the control terminals of the second switching transistors Ts2 of the first-stage gate drive circuit GDC (1) to the second-stage gate drive circuit GDC(2) correspond to the low-level signals VGL. The control terminal of the second switching transistor Ts2 of the gate drive circuit at each stage located after the second-stage gate drive circuit GDC(2) is configured to receive the first gate control signal Nscan outputted by a two-stage-preceding gate drive circuit (the control terminal of the second switching transistor Ts2 of the nth-stage gate drive circuit GDC(n) is configured to receive the (n−2)th-stage first gate control signal Nscan(n−2) outputted by the (n−2)th-stage gate drive circuit GDC(n−2)), as shown in FIG. 1A.

The following describes the circuit structure of the gate drive circuit GDC by taking an example in which multiple gate drive circuits GDC use two frequency-division control signals LF to implement control of the level states of the first gate control signal Nscan and the second gate control signal Pscan, respectively. Still referring to FIG. 2D, the frequency-division control module 50 is designed to correspond to the first output module 30 and the second output module 40, and the frequency-division control module 50 controls the signal transmission between the first power supply terminal PVGL and the second node K2 according to the frequency-division control signals LF.

Figure 2D:
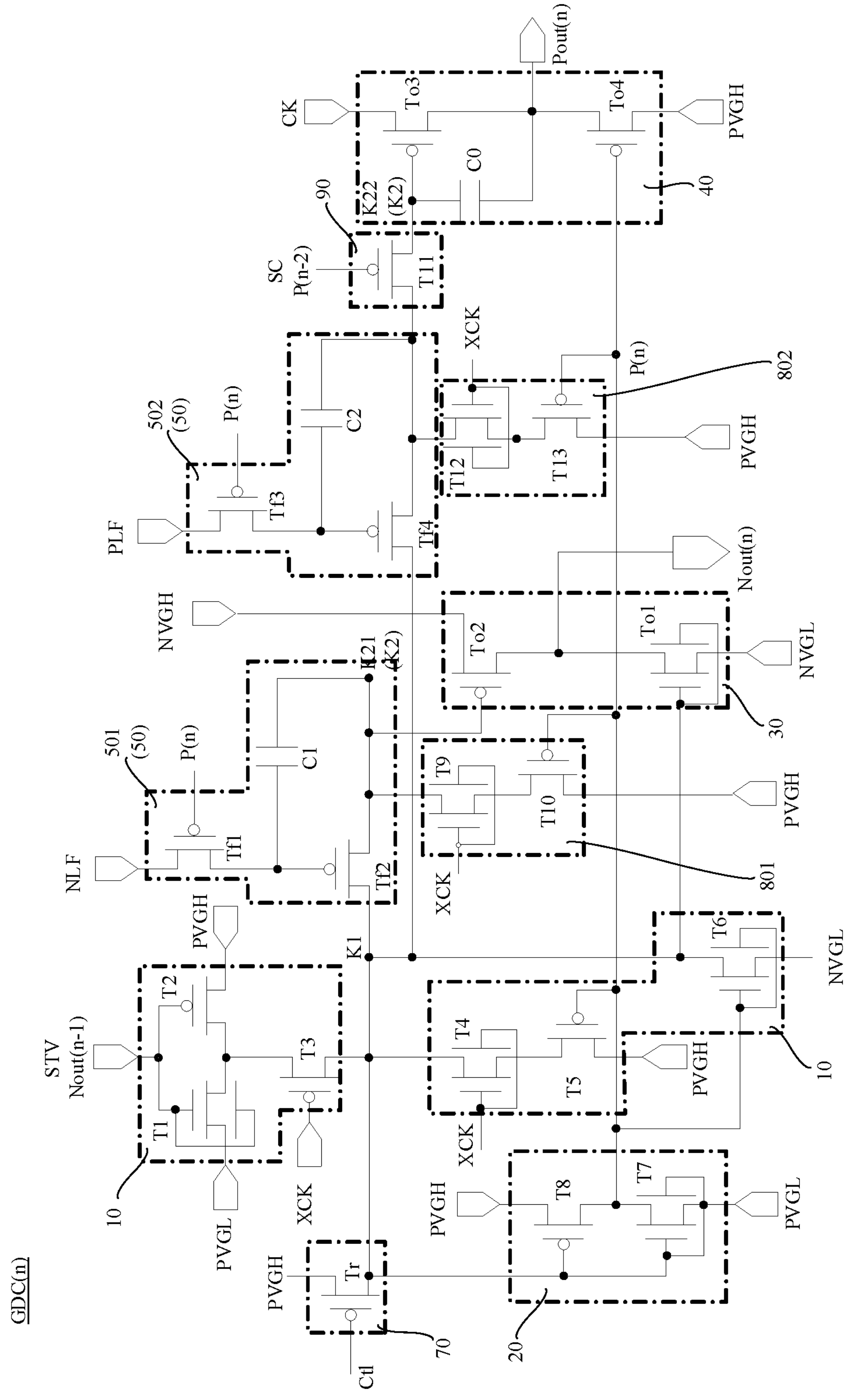

Still referring to FIG. 2D, the second node K2 includes a first sub-node K21 and a second sub-node K22, the frequency-division control signals LF include a first frequency-division control signal NLF and a second frequency-division control signal PLF, and the frequency-division control module 50 includes a first frequency-division control module 501 and a second frequency-division control module 502.

The first frequency-division control module 501 is electrically connected to the first node K1 and the first sub-node K21, and the first frequency-division control module 501 is configured to control signal transmission between the first power supply terminal PVGL and the first sub-node K21 according to the first frequency-division control signal NLF.

The second frequency-division control module 502 is electrically connected to the first node K1 and the second sub-node K22, and the second frequency-division control module 502 is configured to control signal transmission between the first power supply terminal PVGL and the second sub-node K22 according to the second frequency-division control signal PLF.

Wherein the first output module 30 is electrically connected to the first sub-node K21, and the first output module 30 is configured to output the first gate control signal Nscan of the current-stage gate drive circuit GDC according to the potential of the first node K1 and the potential of the first sub-node K21. The second output module 40 is electrically connected to the second sub-node K22, and the second output module 40 is configured to output the second gate control signal Pscan of the current-stage gate drive circuit GDC according to the potential of the second sub-node K22 and the potential of the third node P.

The level states of the first gate control signal Nscan is controlled by setting the first frequency-division control module 501 to control signal transmission of the first node K1 and the first sub-node K21. The level states of the second gate control signal Pscan is controlled by setting the second frequency-division control module 502 to control signal transmission of the first node K1 and the second sub-node K22. The first frequency-division control module 501 and the second frequency-division control module 502 cooperate with each other to implement control of the level states of the first gate control signal Nscan and the second gate control signal Pscan.

Optionally, with continued reference to FIG. 2D, the first frequency-division control module 501 includes a first frequency-division transistor Tf1, a second frequency-division transistor Tf2, and a first capacitor C1.

A control terminal of the first frequency-division transistor Tf1 is electrically connected to the third node P of the current-stage gate drive circuit GDC, and an input terminal of the first frequency-division transistor Tf1 is configured to receive the first frequency-division control signal NLF.

A control terminal of the second frequency-division transistor Tf2 is electrically connected to an output terminal of the first frequency-division transistor Tf1, an input terminal of the second frequency-division transistor Tf2 is electrically connected to the first node K1, and an output terminal of the second frequency-division transistor Tf2 is electrically connected to the first sub-node K21.

A first terminal of the first capacitor C1 is electrically connected to the control terminal of the second frequency-division transistor Tf2, and a second terminal of the first capacitor C1 is electrically connected to the first sub-node K21.

Optionally, with continued reference to FIG. 2D, the second frequency-division control module 502 includes a third frequency-division transistor Tf3, a fourth frequency-division transistor Tf4, and a second capacitor C2.

A control terminal of the third frequency-division transistor Tf3 is electrically connected to the third node P of the current-stage gate drive circuit GDC, and an input terminal of the third frequency-division transistor Tf3 is configured to receive the second frequency-division control signal PLF.

A control terminal of the fourth frequency-division transistor Tf4 is electrically connected to an output terminal of the third frequency-division transistor Tf3, an input terminal of the fourth frequency-division transistor Tf4 is electrically connected to the first node K1, and an output terminal of the fourth frequency-division transistor Tf4 is electrically connected to the second sub-node K22.

A first terminal of the second capacitor C2 is electrically connected to the control terminal of the fourth frequency-division transistor Tf4, and a second terminal of the second capacitor C2 is electrically connected to the second sub-node K22.

The control terminal of the first frequency-division transistor Tf1 and the control terminal of the third frequency-division transistor Tf3 are controlled by the third node P of the current-stage gate drive circuit GDC, so that the gate control signals outputted by the corresponding gate drive circuits GDC at multiple stages may still meet the design expectation when the level state transitions occur between the first frequency-division control signal NLF and the second frequency-division control signal PLF of the gate drive unit, and the probability of abnormality of the first gate control signals Nscan and the second gate control signals Pscan outputted at the multiple stages of the gate drive unit is reduced.

Since the first frequency-division control module 501 is designed to correspond to the first output module 30 and the second frequency-division control module 502 is designed to correspond to the second output module 40, the connection relationship between the first output module 30 and the second output module 40 when the gate drive circuits GDC at the multiple stages are controlled by the first frequency-division control signal NLF and the second frequency-division control signal PLF is distinguished from the connection relationship between the first output module 30 and the second output module 40 when the gate drive circuits GDC at the multiple stages are controlled by a single frequency-division control signal LF.

Accordingly, with continued reference to FIG. 2D, the first output module 30 includes a first output transistor To1 and a second output transistor To2.

A first control terminal and a second control terminal of the first output transistor To1 are electrically connected to the first node K1, and an input terminal of the first output transistor To1 is electrically connected to the third power supply terminal NVGL.

A control terminal of the second output transistor To2 is electrically connected to the first sub-node K21, an input terminal of the second output transistor To2 is electrically connected to the fourth power supply terminal NVGH, and an output terminal of the second output transistor To2 and an output terminal of the first output transistor To1 are electrically connected to the first output terminal Nout of the current-stage gate drive circuit GDC.

Still referring to FIG. 2D, the second output module 40 includes a third output transistor To3, a fourth output transistor To4, and a storage capacitor C0.

A control terminal of the third output transistor To3 is electrically connected to the second sub-node K22, and an input terminal of the third output transistor To3 is configured to receive a corresponding second clock signal CK.

A control terminal of the fourth output transistor To4 is electrically connected to the third node P, an input terminal of the fourth output transistor To4 is electrically connected to the second power supply terminal PVGH, and an output terminal of the fourth output transistor To4 and an output terminal of the third output transistor To3 are electrically connected to the second output terminal Pout of the current-stage gate drive circuit GDC.

A first terminal of the storage capacitor C0 is electrically connected to the control terminal of the third output transistor To3, and a second terminal of the storage capacitor C0 is electrically connected to the second output terminal Pout of the current-stage gate drive circuit GDC.

That is, when the gate drive circuits GDC at the multiple stages are controlled by the first frequency-division control signal NLF and the second frequency-division control signal PLF, the control terminal of the second output transistor To2 is electrically connected to the first sub-node K21, the control terminal of the third output transistor To3 is electrically connected to the second sub-node K22, so that the turn-on and turn-off of the second output transistor To2 are controlled by the potential of the first sub-node K21, and the turn-on and turn-off of the third output transistor To3 are controlled by the potential of the second sub-node K22.

Optionally, in some embodiments, at least one of the gate drive circuits GDC further includes a third control module 801, the third control module 801 being electrically connected to the third node P of the current-stage gate drive circuit GDC and the first sub-node K21 of the current-stage gate drive circuit GDC, the third control module 801 being configured to control signal transmission between the second power supply terminal PVGH and the first sub-node K21 in accordance with the corresponding first clock signal XCK and the potential of the third node P.

Optionally, with continued reference to FIG. 2D, the third control module 801 includes a ninth transistor T9 and a tenth transistor T10.

A first control terminal and a second control terminal of the ninth transistor T9 are configured to receive a corresponding first clock signal XCK, and an output terminal of the ninth transistor T9 is electrically connected to the first sub-node K21.

A control terminal of the tenth transistor T10 is electrically connected to the third node P of the current-stage gate drive circuit GDC, an input terminal of the tenth transistor T10 is electrically connected to the second power supply terminal PVGH, and an output terminal of the tenth transistor T10 is electrically connected to an input terminal of the ninth transistor T9.

Optionally, in some embodiments, at least one of the gate drive circuits GDC further includes a switching module 90, the switching module 90 being electrically connected between the second frequency-division control module 502 and the second sub-node K22, the switching module 90) being configured to control the electrical connection between the second frequency-division control module 502 and the second sub-node K22 according to a corresponding switching control signal SC.

Optionally, with continued reference to FIG. 2D, the switching module 90 includes an eleventh transistor T11, a control terminal of the eleventh transistor T11 being configured to receive the switching control signal SC, an input terminal of the eleventh transistor T11 being electrically connected to the output terminal of the third frequency-division transistor Tf3, and an output terminal of the eleventh transistor T11 being electrically connected to the second sub-node K22.

Optionally, the control terminal of the eleventh transistor T11 of the nth-stage gate drive circuit GDC(n) is configured to receive the (n−C)th-stage first gate control signal Nscan (n−C) outputted by the (n−C)th-stage gate drive circuit GDC(n−C) to use the (n−C)th-stage first gate control signal Nscan(n−C) outputted by the (n−C)th-stage gate drive circuit GDC(n−C) as the switching control signal SC received by the control terminal of the eleventh transistor T11 of the nth-stage gate drive circuit GDC(n).

Optionally, the switching control signal(s) SC received at the control terminals of the eleventh transistors T11 of the first-stage gate drive circuit GDC(1) to the second-stage gate drive circuit GDC(2) correspond(s) to low-level signal(s) VGL. The control terminal of the eleventh transistor T11 of the gate drive circuit at each stage located after the second-stage gate drive circuit GDC(2) is configured to receive the first gate control signal Nscan outputted by the two-stage-preceding gate drive circuit (e.g., the control terminal of the eleventh transistor T11 of the nth-stage gate drive circuit GDC(n) is configured to receive the (n−2)th-stage first gate control signals Nscan(n−2) outputted by the (n−2)th-stage gate drive circuit GDC(n−2)), as shown in FIG. 1B.

Optionally, the control terminal of the eleventh transistor T11 is electrically connected to the third node P of a previous-stage gate drive circuit GDC so as to control an operation state of the eleventh transistor T11 by utilizing the potential of the third node P of the previous-stage gate drive circuit GDC as the switching control signal SC, reducing the load(s) carried by the first output terminal(s) Nout of the gate drive circuit(s) GDC. For example, the control terminal of the eleventh transistor T11 of the nth-stage gate drive circuit GDC(n) is electrically connected to the third node P of the (n−C)th-stage gate drive circuit GDC(n−C), so that the potential of the third node P of the (n−C)th-stage gate drive circuit GDC(n−C) is used as the switching control signal SC received at the control terminal of the eleventh transistor T11 of the nth-stage gate drive circuit GDC(n).

Optionally, in some embodiments, at least one of the gate drive circuits GDC further includes a fourth control module 802.

The fourth control module 802 is electrically connected to the third node P of the current-stage gate drive circuit GDC and the second sub-node K22 of the current-stage gate drive circuit GDC. The fourth control module 802 is configured to control signal transmission between the second power supply terminal PVGH and the second sub-node K22 according to the corresponding first clock signal XCK and the potential of the third node P.

Optionally, with continued reference to FIG. 2D, the fourth control module 802 includes a twelfth transistor T12 and a thirteenth transistor T13.

A first control terminal and a second control terminal of the twelfth transistor T12 are configured to receive a corresponding first clock signal XCK, and an output terminal of the twelfth transistor T12 is electrically connected to the input terminal of the eleventh transistor T11.

A control terminal of the thirteenth transistor T13 is electrically connected to the third node P of the current-stage gate drive circuit GDC, an input terminal of the thirteenth transistor T13 is electrically connected to the second power supply terminal PVGH, and an output terminal of the thirteenth transistor T13 is electrically connected to an input terminal of the twelfth transistor T12.

Optionally, with continued reference to FIGS. 2A-2D, at least one of the gate drive circuits GDC further includes a reset module 70, the reset module 70 being electrically connected to the first node K1, the reset module 70 being configured to control signal transmission between the second power supply terminal PVGH and the first node K1 in accordance with a reset control signal Ctl.

Optionally, the reset module 70 includes a reset transistor Tr, a control terminal of the reset transistor Tr being configured to receive the reset control signal Ctl, an input terminal of the reset transistor Tr being electrically connected to the second power supply terminal PVGH, and an output terminal of the reset transistor Tr being electrically connected to the first node K1.

Optionally, when the gate drive unit is applied in the display device, the reset module 70 is configured to be enabled when the display device is turned on and/or during a blanking interval.

Optionally, in some embodiments, the voltage corresponding to the first power supply terminal PVGL is less than the voltage corresponding to the second power supply terminal PVGH, and the voltage corresponding to the third power supply terminal NVGL is less than the voltage corresponding to the fourth power supply terminal NVGH.

Optionally, in some embodiments, at least one of the first transistor T1, the fourth transistor T4, the sixth transistor T6, the seventh transistor T7, the ninth transistor T9, the twelfth transistor T12, and the first output transistor To1 may correspondingly have only one control terminal.

It will be appreciated that each transistor included in the gate driving circuit GDC may be one of a P-type transistor and an N-type transistor. The semiconductor of each transistor included in the gate drive circuit GDC may be one of silicon semiconductor and oxide semiconductor.

FIGS. 3A-3D are timing diagrams of a gate drive circuit according to an embodiment of the present disclosure. Wherein, FIG. 3A corresponds to the gate drive circuit GDC shown in FIGS. 2A-2C, and FIGS. 3B-3C correspond to the gate drive circuit GDC shown in FIG. 2D.

The following first describes the operation principle of the gate drive unit by taking multiple gate drive circuits GDC controlled by a same frequency-division control signal LF as an example. That is, the following is taken as an example to explain the gate drive unit including the gate drive circuits GDC shown in FIGS. 2A-2C, and the operation principle in which a plurality of gate drive circuits GDC of the gate drive unit are cascaded in a cascaded manner shown in FIG. 1A: the second transistor T2, the third transistor T3, the fifth transistor T5, the eighth transistor T8, the first switching transistor Ts1, the second switching transistor Ts2, the second output transistor To2 to the fourth output transistor To4, and the frequency-division transistor Tf are P-type transistors, the first transistor T1, the fourth transistor T4, the sixth transistor T6, the seventh transistor T7, and the first output transistor To1 are N-type transistors, the frequency-division control signal LF has a transition from a low-level state to a high-level state in the pth-stage gate drive circuit GDC to the (p+q)th-stage gate drive circuit GDC(p+q) corresponding to the gate drive unit, the first clock signal XCK corresponding to the (p+4x)th-stage gate drive circuit GDC is provided by the second clock line CKL2, the second clock signal CK corresponding to the (p+4x)th-stage gate drive circuit GDC is provided by the first clock line CKL1, the first clock signal XCK corresponding to the (p+(4x+1))th-stage gate drive circuit GDC is provided by the third clock line CKL3, the second clock signal CK corresponding to the (p+(4x+1))th-stage gate drive circuit GDC is provided by the second clock line CKL2, the first clock signal XCK corresponding to the (p+(4x+2))th-stage gate drive circuit GDC is provided by the fourth clock line CKL4, the second clock signal CK corresponding to the (p+(4x+2))th-stage gate drive circuit GDC is provided by the third clock line CKL3, the first clock signal XCK corresponding to the (p+(4x+3))th-stage gate drive circuit GDC is provided by the first clock line CKL1, and the second clock signal CK corresponding to the (p+(4x+3))th-stage gate drive circuit GDC is provided by the fourth clock line CKL4. Wherein, $p \geq 1$, $q \geq 1$, $x \geq 0$.

Still referring to FIGS. 2A-2C and 3A, in the first phase t1, the first clock signal CK1 provided by the first clock line CKL1 has a high-level state, the second clock signal CK2 provided by the second clock line CKL2 has a low-level state, the third clock signal CK3 provided by the third clock line CKL3 has a high-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−4)th-stage first gate control signal Nscan(p−4) outputted by the (p−4)th-stage gate drive circuit GDC(p−4) have a high-level state, the (p−3)th-stage first gate control signal Nscan(p−3) outputted by the (p−3)th-stage gate drive circuit GDC(p−3) to the (p−1)th-stage first gate control signal Nscan(p−1) outputted by the (p−1)

th-stage gate drive circuit GDC(p−1) have a low-level state; the frequency-division control signal LF has a low-level state.

In the pth-stage gate drive circuit GDC(p) and the (p+4)th-stage gate drive circuit GDC(p+4), the second transistor T2, the third transistor T3, the second switching transistor Ts2, and the frequency-division transistor Tf are turned on, and the fourth transistor T4 and the first switching transistor Ts1 are turned off. The second power supply terminal PVGH is electrically connected to the first node K1. The seventh transistor T7, the first output transistor To1, and the fourth output transistor To4 are turned on. The third power supply terminal NVGL is electrically connected to the first output terminal Nout. The second power supply terminal PVGH is electrically connected to the second output terminal Pout. The first power supply terminal PVGL is electrically connected to the third node P. The fifth transistor T5 is turned on. The sixth transistor T6, the eighth transistor T8, the second output transistor To2, and the third output transistor To3 are turned off.

In the (p+1)th-stage gate drive circuit GDC(p+1) to the (p+3)th-stage gate drive circuit GDC(p+3) and the (p+5)th-stage gate drive circuit GDC(p+5) to the (p+7)th-stage gate drive circuit GDC(p+7), the second transistor T2 is turned on and the third transistor T3 is turned off, and therefore, the (p+1)th-stage first gate control signal Nscan(p+1) to the (p+3)th-stage first gate control signal Nscan(p+3) and the (p+5)th-stage first gate control signal Nscan(p+5) to the (p+7)th-stage first gate control signal Nscan(p+7) are kept in low-level states, and the (p+1)th-stage second gate control signal Pscan(p+1) to the (p+3)th-stage second gate control signal Pscan(p+3) and the (p+5)th-stage second gate control signal Pscan(p+5) to the (p+7)th-stage second gate control signal Pscan(p+7) are kept in high-level states.

In the (p+8)th-stage gate drive circuit GDC(p+8), the second transistor T2, the third transistor T3, the first switching transistor Ts1, the second switching transistor Ts2, and the frequency-division transistor Tf are turned on, the fifth transistor T5, the seventh transistor T7, the first output transistor To1, and the fourth output transistor To4 are turned on, and the fourth transistor T4, the sixth transistor T6, the eighth transistor T8, the second output transistor To2, and the third output transistor To3 are turned off.

In the first phase t1, the gate drive circuit GDC located after the (p+8)th-stage gate drive circuit GDC(p+8) and in which the first clock signal XCK is correspondingly provided by the second clock line CKL2 and the second clock signal CK is correspondingly provided by the first clock line CKL1 performs the similar action(s) as the (p+8)th-stage gate drive circuit GDC(p+8). In the first phase t1, the gate drive circuit GDC located after the (p+8)th-stage gate drive circuit GDC(p+8) and in which the first clock signal XCK is not correspondingly provided by the second clock line CKL2 and the second clock signal CK is not correspondingly provided by the first clock line CKL1 performs the similar action(s) as the (p+7)th-stage gate drive circuit GDC(p+7).

Still referring to FIGS. 2A-2C and 3A, in the second phase t2, the first clock signal CK1 provided by the first clock line CKL1 has a low-level state, the second clock signal CK2 provided by the second clock line CKL2 has a high-level state, the third clock signal CK3 provided by the third clock line CKL3 has a high-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−9)th-stage first gate control signal Nscan(p−9) outputted by the (p−9)th-stage gate drive circuit GDC(p−9) have low-level states, and the (p−8)th-stage first gate control signal Nscan(p−8) outputted by the (p−8)th-stage gate drive circuit GDC(p−8) to the (p−1)th-stage first gate control signal Nscan(p−1) outputted by the (p−1)th-stage gate drive circuit GDC(p−1) have high-level states; and the frequency-division control signal LF has a low-level state.

In the pth-stage gate drive circuit GDC(p), the first switching transistor Ts1, the first transistor T1, and the frequency-division transistor Tf are turned on, and the second switching transistor Ts2, the second transistor T2, and the third transistor T3 are turned off. The fourth transistor T4, the fifth transistor T5, the seventh transistor T7, the first output transistor To1, and the fourth output transistor To4 are kept on, and the sixth transistor T6, the eighth transistor T8, the second output transistor To2, and the third output transistor To3 are kept off.

In the (p+1)th-stage gate drive circuit GDC(p+1) to the (p+q)th-stage gate drive circuit GDC(p+q), the second transistor T2 is turned on because the activation signal(s) STV received at the control terminals of the second transistors T2 has a low-level state corresponding to the second phase t2. In the gate drive circuit GDC located after the pth-stage gate drive circuit GDC(p) and in which the first clock signal XCK is correspondingly provided by the first clock line CKL1 and the second clock signal CK is correspondingly provided by the fourth clock line CKL4, the third transistor T3 is turned on, and the second power supply terminal PVGH is electrically connected to the first node K1. In the gate drive circuit GDC located after the pth-stage gate drive circuit GDC(p) and in which the first clock signal XCK is not correspondingly provided by the first clock line CKL1 and the second clock signal CK is not correspondingly provided by the fourth clock line CKL4, the third transistor T3 is turned off. The (p+1)th-stage first gate control signal Nscan(p+1) to the (p+q)th-stage first gate control signal Nscan(p+q) are kept in the low-level states, and the (p+1)th-stage second gate control signal Pscan(p+1) to the (p+q)th-stage second gate control signal Pscan(p+q) are kept in the high-level states.

Still referring to FIGS. 2A-2C and 3A, in the third phase t3, the first clock signal CK1 provided by the first clock line CKL1 has a high-level state, the second clock signal CK2 provided by the second clock line CKL2 has a low-level state, the third clock signal CK3 provided by the third clock line CKL3 has a high-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−8)th-stage first gate control signal Nscan(p−8) outputted by the (p−8)th-stage gate drive circuit GDC(p−8) have low-level states, and the (p−7)th-stage first gate control signal Nscan(p−7) outputted by the (p−7)th-stage gate drive circuit GDC(p−7) to the (p−1)th-stage first gate control signal Nscan(p−1) outputted by the (p−1)th-stage gate drive circuit GDC(p−1) have high-level states; the frequency-division control signal LF has a low-level state.

In the pth-stage gate drive circuit GDC(p), the first switching transistor Ts1, the first transistor T1, the third transistor T3, and the frequency-division transistor Tf are turned on, and the second switching transistor Ts2, the second transistor T2, and the fourth transistor T4 are turned off. The first power supply terminal PVGL is electrically connected to the first node K1. The sixth transistor T6, the eighth transistor T8, and the second output transistor To2 are turned on. The fifth transistor T5, the seventh transistor T7, the first output transistor To1, and the fourth output transistor To4 are turned off. The third output transistor To3 is kept off. The first output terminal Nout is electrically connected to the third power supply terminal NVGL. The second output terminal Pout is kept in the output state in the first phase t1.

In the third phase t3, the (p+1)th-stage gate drive circuit GDC(p+1) performs the action(s) similar to that performed by the pth-stage gate drive circuit GDC(p) in the second phase t2; and in the third phase t3, the (p+2)th-stage gate drive circuit GDC(p+2) performs the action(s) similar to that performed by the (p+1)th-stage gate drive circuit GDC(p+1) in the second phase t2. By analogy, the actions performed by the (p+3)th-stage gate drive circuit GDC(p+3) to the (p+q)th-stage gate drive circuit GDC(p+q) in the third phase t3 are obtained.

Still referring to FIGS. 2A-2C and 3A, in the fourth phase t4, the first clock signal CK1 provided by the first clock line CKL1 has a high-level state, the second clock signal CK2 provided by the second clock line CKL2 has a high-level state, the third clock signal CK3 provided by the third clock line CKL3 has a low-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−7)th-stage first gate control signal Nscan(p−7) outputted by the (p−7)th-stage gate drive circuit GDC(p−7) have low-level states, and the (p−6)th-stage first gate control signal Nscan(p−6) outputted by the (p−6)th-stage gate drive circuit GDC(p−6) has a high-level state; the frequency-division control signal LF has a low-level state.

In the pth-stage gate drive circuit GDC(p), the first switching transistor Ts1, the first transistor T1, the frequency-division transistor Tf, the sixth transistor T6, the eighth transistor T8, and the second output transistor To2 are turned on, the fourth transistor T4 is turned on, the third transistor T3 is turned off, and the second switching transistor Ts2, the second transistor T2, the fifth transistor T5, the seventh transistor T7, the first output transistor To1, the fourth output transistor To4, and the third output transistor To3 are kept off. The first output terminal Nout is electrically connected to the third power supply terminal NVGL. The second output terminal Pout is kept in the output state in the third phase t3.

In the fourth phase t4, the (p+1)th-stage gate drive circuit GDC(p+1) performs the action(s) similar to that performed by the pth-stage gate drive circuit GDC(p) in the third phase t3; and in the fourth phase t4, the (p+2)th-stage gate drive circuit GDC(p+2) performs the action(s) similar to that performed by the (p+1)th-stage gate drive circuit GDC(p+1) in the third phase t3. By analogy, the actions performed by the (p+3)th-stage gate drive circuit GDC(p+3) to the (p+q)th-stage gate drive circuit GDC(p+q) in the fourth phase t4 are obtained.

Still referring to FIGS. 2A-2C and 3A, in the fifth phase t5, the first clock signal CK1 provided by the first clock line CKL1 has a high-level state, the second clock signal CK2 provided by the second clock line CKL2 has a high-level state, the third clock signal CK3 provided by the third clock line CKL3 has a high-level state, and the fourth clock signal CK4 provided by the fourth clock line CKL4 has a low-level state. The (p−10)th-stage first gate control signal Nscan(p−10) outputted by the (p−10)th-stage gate drive circuit GDC(p−10) to the (p−2)th-stage first gate control signal Nscan(p−2) outputted by the (p−2)th-stage gate drive circuit GDC(p−2) have low-level states, and the (p−1)th-stage first gate control signal Nscan(p−1) outputted by the (p−1)th-stage gate drive circuit GDC(p−1) has a high-level state; the frequency-division control signal LF has a low-level state.

In the pth-stage gate drive circuit GDC(p), the first switching transistor Ts1, the first transistor T1, and the frequency-division transistor Tf is kept on. The second switching transistor Ts2 is turned on, so that the third output transistor To3 is turned on, and the corresponding first clock signal XCK is transmitted to the second output terminal Pout. The second transistor T2, the third transistor T3, the fifth transistor T5, the seventh transistor T7, the first output transistor To1, and the fourth output transistor To4 are kept off. The fourth transistor T4 is turned on. The sixth transistor T6, the eighth transistor T8, and the second output transistor To2 are kept on. The first output terminal Nout is electrically connected to the third power supply terminal NVGL.

In each of the (p+1)th-stage gate drive circuit GDC(p+1) and the (p+3)th-stage gate drive circuit GDC(p+3) to the (p+5)th-stage gate drive circuit GDC(p+5), the corresponding first clock signal XCK has a high-level state, the third transistor T3 is turned off, and the second output transistor To2 is kept on. In the (p+2)th-stage gate drive circuit GDC(p+2), the corresponding first clock signal XCK has a low-level state, the third transistor T3 is turned on, the second switching transistor Ts2 is turned off, the first power supply terminal PVGL and the first node K1 are electrically connected, and the second output transistor To2 is kept on. In the fifth phase t5, the (p+6)th-stage gate drive circuit GDC(p+6) performs the action(s) similar to that performed by the pth-stage gate drive circuit GDC(p) in the third phase t3; and in the fifth phase t5, the (p+7)th-stage gate drive circuit GDC(p+7) performs the action(s) similar to that performed by the (p+1)th-stage gate drive circuit GDC(p+1) in the third phase t3. By analogy, the actions performed by the (p+8)th-stage gate drive circuit GDC(p+8) to the (p+q)th-stage gate drive circuit GDC(p+q) in the fifth phase t5 are obtained.

Referring to FIGS. 2A-2C and 3A, in the sixth phase t6, the first clock signal CK1 provided by the first clock line CKL1 has a low-level state, the second clock signal CK2 provided by the second clock line CKL2 has a high-level state, the third clock signal CK3 provided by the third clock line CKL3 has a high-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−1)th-stage first gate control signal Nscan(p−1) outputted by the (p−1)th-stage gate drive circuit GDC(p−1) have low-level states; the frequency-division control signal LF has a low-level state.

In the pth-stage gate drive circuit GDC(p), the second transistor T2 is turned on, the first switching transistor Ts1, the second switching transistor Ts2, the frequency-division transistor Tf, and the third output transistor To3 are kept on, and the corresponding first clock signal XCK is transmitted to the second output terminal Pout so that the pth-stage second gate control signal Pscan(p) has a low-level state. The third transistor T3, the fifth transistor T5, the seventh transistor T7, the first output transistor To1, and the fourth output transistor To4 are kept off. The fourth transistor T4, the sixth transistor T6, the eighth transistor T8, and the second output transistor To2 are kept on. The first output terminal Nout is electrically connected to the third power supply terminal NVGL.

In the sixth phase t6, the (p+1)th-stage gate drive circuit GDC(p+1) performs the action(s) similar to that performed by the pth-stage gate drive circuit GDC(p) in the fifth phase t5; in the sixth phase t6, the (p+2)th-stage gate drive circuit GDC(p+2) performs the action(s) similar to that performed by the (p+1)th-stage gate drive circuit GDC(p+1) in the fifth phase t5. By analogy, the actions performed by the (p+3)th-stage gate drive circuit GDC(p+3) to the (p+q)th-stage gate drive circuit GDC(p+q) in the sixth phase t6 are obtained.

Still referring to FIGS. 2A-2C and 3A, in the seventh phase t7, the first clock signal CK1 provided by the first clock line CKL1 has a high-level state, the second clock signal CK2 provided by the second clock line CKL2 has a low-level state, the third clock signal CK3 provided by the third clock line CKL3 has a high-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−1)th-stage first gate control signal Nscan(p−1) outputted by the (p−1)th-stage gate drive circuit GDC(p−1) have low-level states, and the frequency-division control signal LF has a low-level state.

In the pth-stage gate drive circuit GDC(p), the second transistor T2, the third transistor T3, the first switching transistor Ts1, the second switching transistor Ts2, and the frequency-division transistor Tf are turned on. The second power supply terminal PVGH is electrically connected to the first node K1. The fifth transistor T5, the seventh transistor T7, the first output transistor To1, and the fourth output transistor To4 are turned on. The first transistor T1, the fourth transistor T4, the sixth transistor T6, the second output transistor To2, and the third output transistor To3 are turned off. The third power supply terminal NVGL is electrically connected to the first output terminal Nout. The second power supply terminal PVGH is electrically connected to the second output terminal Pout.

In the seventh phase t7, the (p+1)th-stage gate drive circuit GDC(p+1) performs the action(s) similar to that performed by the pth-stage gate drive circuit GDC(p) in the sixth phase t6. The (p+1)th-stage second gate control signal Pscan(p+1) has a low-level state. In the seventh phase t7, the (p+2)th-stage gate drive circuit GDC(p+2) performs the action(s) similar to that performed by the (p+1)th-stage gate drive circuit GDC(p+1) in the sixth phase t6, and by analogy, the actions performed by the (p+3)th-stage gate drive circuit GDC(p+3) to the (p+q)th-stage gate drive circuit GDC(p+q) in the seventh phase t7 are obtained.

Still referring to FIGS. 2A-2C and 3A, in the eighth phase t8, the first clock signal CK1 provided by the first clock line CKL1 has a high-level state, the second clock signal CK2 provided by the second clock line CKL2 has a high-level state, the third clock signal CK3 provided by the third clock line CKL3 has a low-level state, and the fourth clock signal CK4 provided by the fourth clock line CKL4 has a high-level state. The (p−10)th-stage first gate control signal Nscan(p−10) outputted by the (p−10)th-stage gate drive circuit GDC(p−10) to the (p−1)th-stage first gate control signal Nscan(p−1) outputted by the (p−1)th-stage gate drive circuit GDC(p−1) have low-level states, and the frequency-division control signal LF has a high-level state.

In the pth-stage gate drive circuit GDC(p), the second transistor T2, the first switching transistor Ts1, the second switching transistor Ts2, the fifth transistor T5, the seventh transistor T7, the first output transistor To1, and the fourth output transistor To4 are kept on, the third transistor T3 and the frequency-division transistor Tf are turned off, the fourth transistor T4 is turned on, and the first transistor T1, the sixth transistor T6, the second output transistor To2, and the third output transistor To3 are kept off.

In each of the (p+1)th-stage gate drive circuit GDC(p+1) to the (p+q)th-stage gate drive circuit GDC(p+q), since the frequency-division transistor Tf is turned off, the potential of the first node K1 maintains the state in the seventh phase t7, so that the second output transistor To2 in each of the (p+1)th-stage gate drive circuit GDC(p+1) to the (p+8)th-stage gate drive circuit GDC(p+8) is turned on, and the first output terminal Nout of each of the (p+1)th-stage gate drive circuit GDC(p+1) to the (p+8)th-stage gate drive circuit GDC(p+8) is electrically connected to the fourth power supply terminal NVGH. The second switching transistor Ts2 and the second output transistor To2 in each of the (p+1)th-stage gate drive circuit GDC(p+1) to the (p+2)th-stage gate drive circuit GDC(p+2) are turned on, the second output terminal Pout of each of the (p+1)th-stage gate drive circuit GDC(p+1) to the (p+2)th-stage gate drive circuit GDC(p+2) receives corresponding second clock signals CK, and the (p+2)th-stage second gate control signal Pscan(p+2) has a low-level state. Whereas in each of the (p+9)th-stage gate drive circuit GDC(p+9)) to the (p+q)th-stage gate drive circuit GDC(p+q), the first output transistor To1 and the fourth output transistor To4 are turned on so that the first output terminal Nout of each of the (p+9)th-stage gate drive circuit GDC(p+9) to the (p+q)th-stage gate drive circuit GDC(p+q) is electrically connected to the third power supply terminal NVGL, and the second output terminal Pout is electrically connected to the second power supply terminal PVGH. Therefore, the (p+9)th-stage first gate control signal Nscan(p+9) of the (p+9)th-stage gate drive circuit GDC(p+9) has no active pulse to output.

Still referring to FIGS. 2A-2C and 3A, in the ninth phase t9, the first clock signal CK1 provided by the first clock line CKL1 has a high-level state, the second clock signal CK2 provided by the second clock line CKL2 has a high-level state, the third clock signal CK3 provided by the third clock line CKL3 has a high-level state, and the fourth clock signal CK4 provided by the fourth clock line CKL4 has a low-level state. The (p−10)th-stage first gate control signal Nscan(p−10) outputted by the (p−10)th-stage gate drive circuit GDC(p−10) to the (p−1)th-stage first gate control signal Nscan(p−1) outputted by the (p−1)th-stage gate drive circuit GDC(p−1) have low-level states, and the frequency-division control signal LF has a high-level state.

In the ninth phase t9, the pth-stage gate drive circuit GDC(p) is kept in same state as in the eighth phase t8. In each of the (p+1)th-stage gate drive circuit GDC(p+1) to the (p+q)th-stage gate drive circuit GDC(p+q), the potential of the first node K1 maintains the state in the eighth phase t8 because the frequency-division transistor Tf is turned off, so that the second output transistor To2 and the third output transistor To3 each of in the (p+1)th-stage gate drive circuit GDC(p+1) to the (p+8)th-stage gate drive circuit GDC(p+8) are turned on, and the first output terminal Nout of each of the (p+1)th-stage gate drive circuit GDC(p+1) to the (p+8)th-stage gate drive circuit GDC(p+8) is electrically connected to the fourth power supply terminal NVGH. The second switching transistor Ts2 and the second output transistor To2 in each of the (p+1)th-stage gate drive circuit GDC(p+1) to the (p+2)th-stage gate drive circuit GDC(p+2) are turned on, and the second output terminal Pout of each of the (p+1)th-stage gate drive circuit GDC(p+1) to the (p+2)th-stage gate drive circuit GDC(p+2) receives the corresponding second clock signals CK. The second switching transistor Ts2 and the second output transistor To2 in the (p+3)th-stage gate drive circuit GDC(p+3) are turned off, and the (p+3)th-stage second control signal of the (p+3)th-stage gate drive circuit GDC(p+3) has no active pulse.

Whereas in each of the (p+9)th-stage gate drive circuit GDC(p+9) to the (p+q)th-stage gate drive circuit GDC(p+q), the first output transistor To1 and the fourth output transistor To4 are turned on so that the first output terminal Nout of each of the (p+9)th-stage gate drive circuit GDC(p+9) to the (p+q)th-stage gate drive circuit GDC(p+q) is electrically connected to the third power supply terminal NVGL, and the second output terminal Pout is electrically connected to the second power supply terminal PVGH. Therefore, the (p+9)th-stage first gate control signal Nscan(p+9) outputted by the (p+9)th-stage gate drive circuit GDC(p+9) to the (p+10)th-stage first gate control signal Nscan(p+10) outputted by the (p+10)th-stage gate drive circuit GDC(p+10) have no active pulse to output.

Thereafter, the frequency-division control signal LF is kept in a high-level state, the first clock signal CK1 to the fourth clock signal CK4 have a switching between a high-level state and a low-level state. The (p+9)th-stage first gate control signal Nscan(p+9) outputted by the (p+9)th-stage gate drive circuit GDC(p+9) to the (p+q)th-stage first gate control signal Nscan(p+q) outputted by (p+q)th-stage gate drive circuit GDC(p+q) have no active pulse to output, and the (p+9)th-stage second gate control signal Pscan(p+9) outputted by the (p+9)th-stage gate drive circuit GDC(p+9) to the (p+q)th-stage second gate control signal Pscan(p+q) outputted by (p+q)th-stage gate drive circuit GDC(p+q) have no active pulse to output.

Wherein, in the eighth phase t8 and the ninth phase t9, the electrical connection between the third transistor T3 and the first node K1 of the gate drive circuit GDC shown in FIG. 2A is disconnected, the control terminal of the first transistor T1 of the gate drive circuit GDC shown in FIG. 2B does not receive the corresponding activation signal STV, and the control terminal of the third transistor T3 of the gate drive circuit GDC shown in FIG. 2C does not receive the corresponding first clock signal XCK.

Therefore, by controlling the frequency-division control signal LF, the level states of the gate control signals outputted by the plurality of gate drive circuits GDC may be controlled to facilitate implementation of the frequency-division region-partition setting of the display panel when the gate drive unit is applied to the display panel.

The following describes the operation principle of the gate drive unit by taking multiple gate drive circuits GDC controlled by the first frequency-division control signal NLF and the second frequency-division control signal PLF. That is, the following is taken as an example to explain the gate drive unit including the gate drive circuits GDC shown in FIG. 2D, and the operation principle in which a plurality of gate drive circuits GDC of the gate drive unit are cascaded in a cascaded manner shown in FIG. 1B: the second transistor T2, the third transistor T3, the fifth transistor T5, the eighth transistor T8, the tenth transistor T10, the eleventh transistor T11, the thirteenth transistor T13, the first frequency-division transistor Tf1 to the fourth frequency-division transistor Tf4, the second output transistor To2 to the fourth output transistor To4 are P-type transistors, the first transistor T1, the fourth transistor T4, the sixth transistor T6, the seventh transistor T7, the ninth transistor T9, the twelfth transistor T12, and the first output transistor To1 are N-type transistors, the first clock signal XCK corresponding to the (p+4x)th-stage gate drive circuit GDC is provided by the second clock line CKL2, the second clock signal CK corresponding to the (p+4x)th-stage gate drive circuit GDC is provided by the first clock line CKL1, the first clock signal XCK corresponding to the (p+(4x+1))th-stage gate drive circuit GDC is provided by the third clock line CKL3, the second clock signal CK corresponding to the (p+(4x+1))th-stage gate drive circuit GDC is provided by the second clock line CKL2, the first clock signal XCK corresponding to the (p+(4x+2))th-stage gate drive circuit GDC is provided by the fourth clock line CKL4, the second clock signal CK corresponding to the (p+(4x+2))th-stage gate drive circuit GDC is provided by the third clock line CKL3, the first clock signal XCK corresponding to the (p+(4x+3))th-stage gate drive circuit GDC is provided by the first clock line CKL1, and the second clock signal CK corresponding to the (p+(4x+3))th-stage gate drive circuit GDC is provided by the fourth clock line CKL4. Wherein, p≥1, q≥1, x≥0.

Figure 3A:
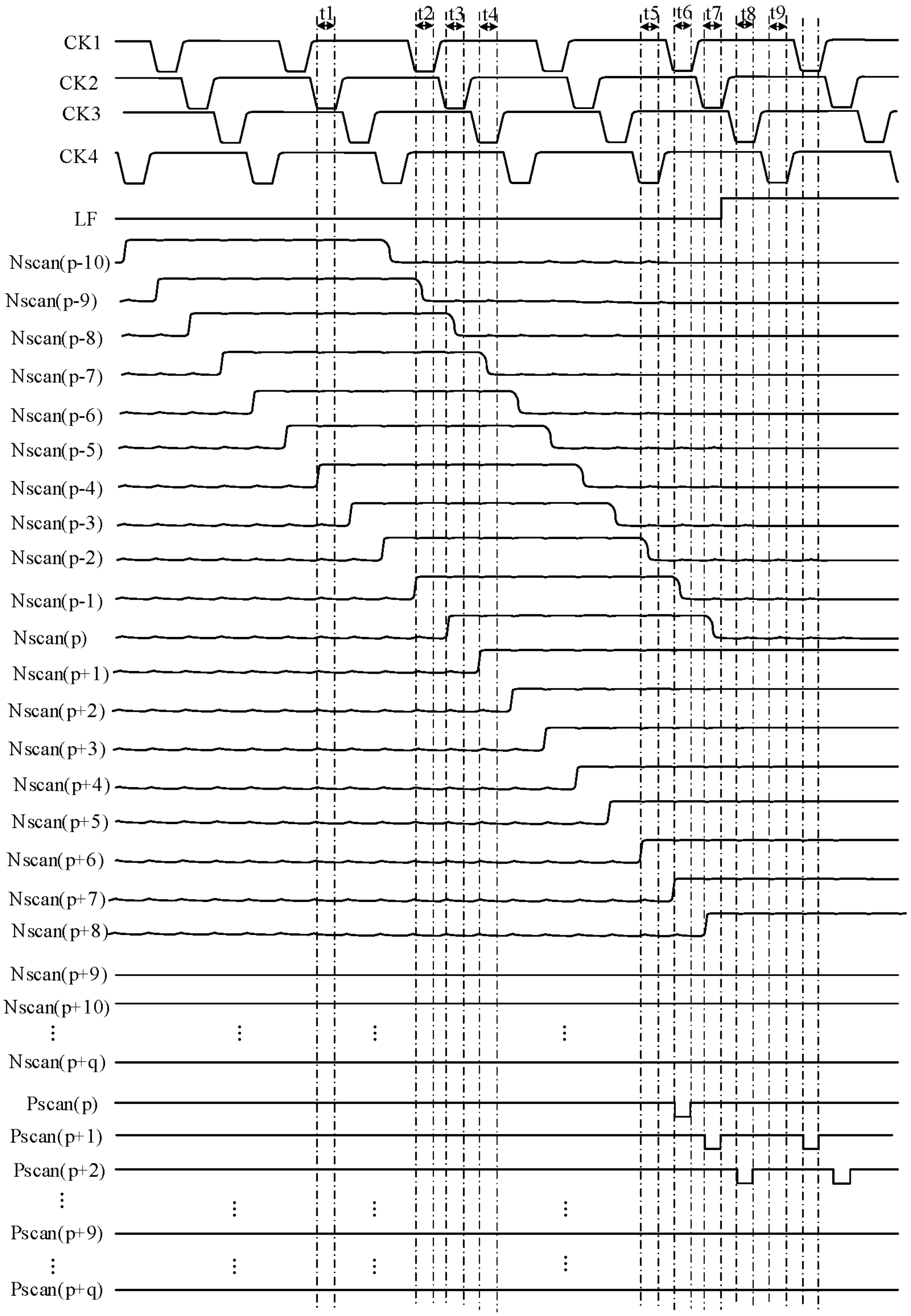
FIGS. 3A-3D are timing diagrams of a gate drive circuit according to an embodiment of the present disclosure.
Figure 3B:
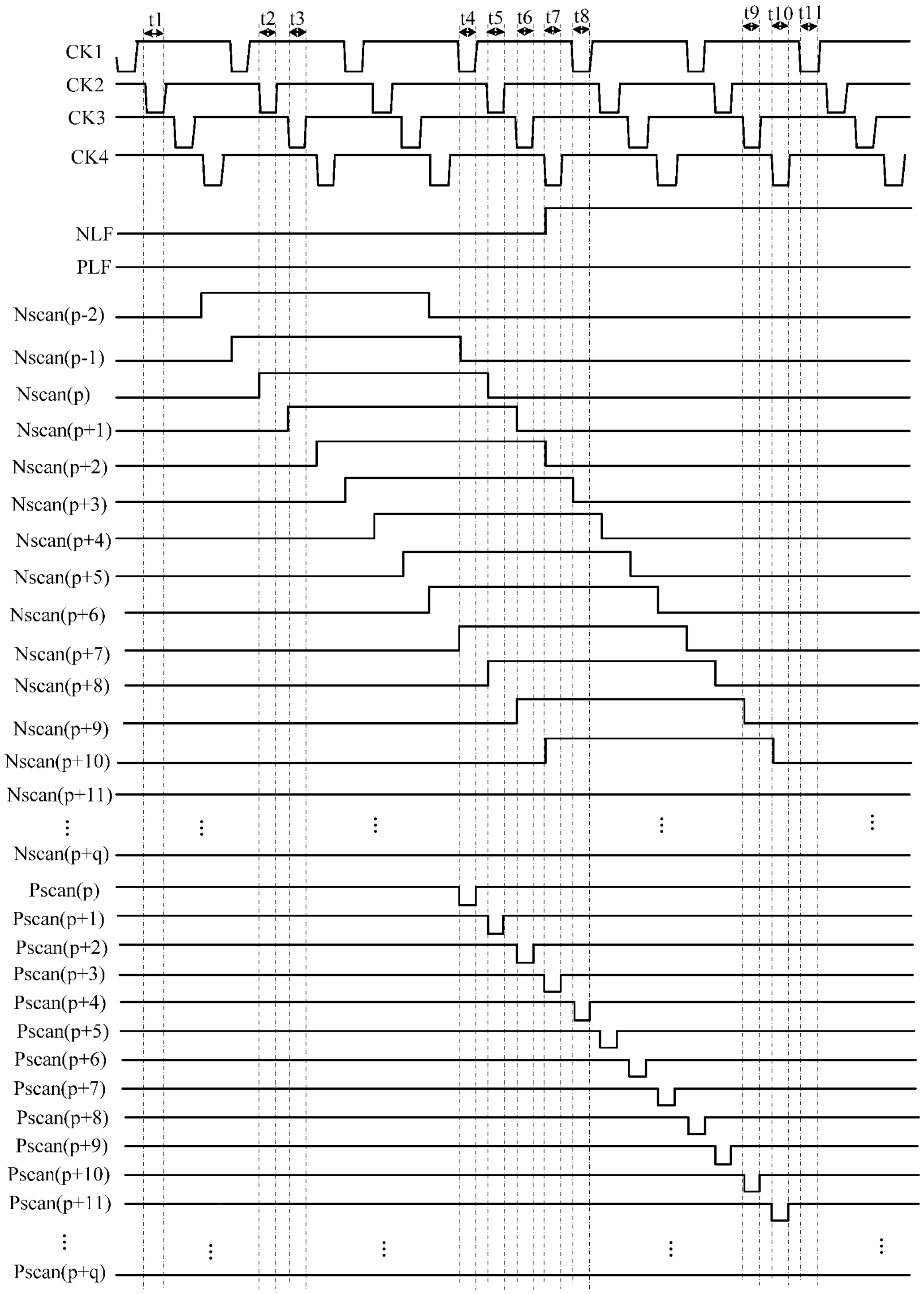

With continued reference to FIGS. 2D and 3B, a description will be first made by taking an example in which the first frequency-division control signal NLF has a transition from a low-level state to a high-level state in the pth-stage gate drive circuit GDC(p) to the (p+q)th-stage gate drive circuit GDC(p+q) of the corresponding gate drive unit.

In the first phase t1, the first clock signal CK1 has a high-level state, the second clock signal CK2 has a low-level state, the third clock signal CK3 has a high-level state, and the fourth clock signal CK4 has a high-level state. The (p−2)th-stage first gate control signal Nscan(p−2) outputted by the (p−2)th-stage gate drive circuit GDC(p−2) to the (p−1)th-stage first gate control signal Nscan(p−1) outputted by the (p−1)th-stage gate drive circuit GDC(p−1) have low-level states. The first frequency-division control signal NLF has a low-level state, and the second frequency-division control signal PLF has a low-level state.

In the pth-stage gate drive circuit GDC(p), the second transistor T2, the third transistor T3, the fifth transistor T5, the seventh transistor T7, the tenth transistor T10, the eleventh transistor T11, the thirteenth transistor T13, the first frequency-division transistor Tf1 to the fourth frequency-division transistor Tf4, the first output transistor To1, and the fourth output transistor To4 are turned on. The first transistor T1, the fourth transistor T4, the sixth transistor T6, the eighth transistor T8, the ninth transistor T9, the twelfth transistor T12, the second output transistor To2, and the third output transistor To3 are turned off. The third power supply terminal NVGL is electrically connected to the first output terminal Nout, and the second power supply terminal PVGH is electrically connected to the second output terminal Pout.

In each of the (p+1)th-stage gate drive circuit GDC(p+1) to the (p+3)th-stage gate drive circuit GDC(p+3), the second transistor T2 is turned on and the third transistor T3 is turned off, and therefore, the (p+1)th-stage first gate control signal Nscan(p+1) to the (p+3)th-stage first gate control signal Nscan(p+3) are kept in low-level states and the (p+1)th-stage second gate control signal Pscan(p+1) to the (p+3)th-stage second gate control signal Pscan(p+3) are kept in high-level states. In the first phase t1, the (p+4)th-stage gate drive circuit GDC(p+4) performs the action(s) similar to that in the pth-stage gate drive circuit GDC(p).

The gate drive circuit GDC, located after the (p+4)th-stage gate drive circuit GDC(p+4), and in which the first clock signal XCK is correspondingly provided by the second clock line CKL2 and the second clock signal CK is correspondingly provided by the first clock line CKL1, performs action(s) similar to that of the pth-stage gate drive circuit GDC(p) in the first phase t1. The gate drive circuit GDC, located after the (p+4)th-stage gate drive circuit GDC(p+4), and in which the first clock signal XCK is not correspondingly provided by the second clock line CKL2 and the second clock signal CK is not correspondingly provided by the first clock line CKL1, performs the action(s) similar to that of the (p+1)th-stage gate drive circuit GDC(p+1) to the (p+3)th-stage gate drive circuit GDC(p+3) in the first phase t1.

In the second phase t2, the first clock signal CK1 has a high-level state, the second clock signal CK2 has a low-level state, the third clock signal CK3 has a high-level state, and the fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have high-level states. The first frequency-division control signal NLF has a low-level state, and the second frequency-division control signal PLF has a low-level state.

In the pth-stage gate drive circuit GDC(p), the first transistor T1, the third transistor T3, the sixth transistor T6, the eighth transistor T8, and the second output transistor To2 are turned on. The second frequency-division transistor Tf2, and the fourth frequency-division transistor Tf4 are kept on. The second transistor T2, the fourth transistor T4, the fifth transistor T5, the seventh transistor T7, the ninth transistor T9, the tenth transistor T10, the eleventh transistor T11, the twelfth transistor T12, the thirteenth transistor T13, the first frequency-division transistor Tf1, the third frequency-division transistor Tf3, the first output transistor To1, the third output transistor To3, and the fourth output transistor To4 are turned off. The fourth power supply terminal NVGH is electrically connected to the first output terminal Nout. The pth-stage second gate control signal Pscan outputted by the second output terminal Pout is kept in a high-level state.

In the (p+1)th-stage gate drive circuit GDC(p+1), the first transistor T1 is turned on, the third transistor T3 is turned off, the (p+1)th-stage first gate control signal Nscan(p+1) is kept in a low-level state, and the (p+1)th-stage second gate control signal Pscan(p+1) is kept in a high-level state. In the (p+2)th-stage gate drive circuit GDC(p+2), the second transistor T2 is turned on, the third transistor T3 is turned off, the (p+2)th-stage first gate control signal Nscan(p+2) is kept in a low-level state, and the (p+2)th-stage second gate control signal Pscan(p+2) is kept in a high-level state.

In the second phase t2, the gate drive circuit GDC, located after the (p+2)th-stage gate drive circuit GDC(p+2), and in which the first clock signal XCK is correspondingly provided by the second clock line CKL2 and the second clock signal CK is correspondingly provided by the first clock line CKL1, performs action(s) similar to that performed by the pth-stage gate drive circuit GDC(p) in the first phase t1. In the second phase t2, the gate drive circuit GDC, located after the (p+2)th-stage gate drive circuit GDC(p+2), and in which the first clock signal XCK is not correspondingly provided by the second clock line CKL2 and the second clock signal CK is not correspondingly provided by the first clock line CKL1, performs the action(s) similar to that performed by the (p+1)th-stage gate drive circuit GDC(p+1) to the (p+3)th-stage gate drive circuit GDC(p+3) in the first phase t1.

In the third phase t3, the first clock signal CK1 has a high-level state, the second clock signal CK2 has a high-level state, the third clock signal CK3 has a low-level state, and the fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have high-level states. The first frequency-division control signal NLF has a low-level state, and the second frequency-division control signal PLF has a low-level state.

In the pth-stage gate drive circuit GDC(p), the first transistor T1, the sixth transistor T6, the eighth transistor T8, and the second output transistor To2, the second frequency-division transistor Tf2, and the fourth frequency-division transistor Tf4 are kept on. The fourth transistor T4, the ninth transistor T9, and the twelfth transistor T12 are turned on. The third transistor T3 is turned off. The second transistor T2, the fifth transistor T5, the seventh transistor T7, the tenth transistor T10, the eleventh transistor T11, the thirteenth transistor T13, the first frequency-division transistor Tf1, the third frequency-division transistor Tf3, the first output transistor To1, the third output transistor To3, and the fourth output transistor To4 are kept off. The fourth power supply terminal NVGH is electrically connected to the first output terminal Nout. The pth-stage second gate control signal Pscan outputted by the second output terminal Pout is kept in a high-level state.

In the third phase t3, the (p+1)th-stage gate drive circuit GDC(p+1) performs the action(s) similar to that performed by the pth-stage gate drive circuit GDC(p) in the second phase t2 so that the fourth power supply terminal NVGH of the (p+1)th-stage gate drive circuit GDC(p+1) is electrically connected to the first output terminal Nout, and the (p+1)th-stage second gate control signal Pscan(p+1) is kept in a high-level state. In the third phase t3, the (p+2)th-stage gate drive circuit GDC(p+2) performs the action(s) similar to that performed by the (p+1)th-stage gate drive circuit GDC(p+1) in the second phase t2. By analogy, the actions performed by the (p+3)th-stage gate drive circuit GDC(p+3) to the (p+q)th-stage gate drive circuit GDC(p+q) in the third phase t3 are obtained.

The fourth phase t4: A first clock signal CK1 has a low-level state, a second clock signal CK2 has a high-level state, a third clock signal CK3 has a high-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a low-level state.

In the pth-stage gate drive circuit GDC(p), the second transistor T2, the fourth transistor T4, the sixth transistor T6, the eighth transistor T8, the ninth transistor T9, the eleventh transistor T11, the twelfth transistor T12, the second frequency-division transistor Tf2, the fourth frequency-division transistor Tf4, the second output transistor To2, and the third output transistor To3 are turned on. The first transistor T1, the third transistor T3, the fifth transistor T5, the seventh transistor T7, the tenth transistor T10, the thirteenth transistor T13, the first frequency-division transistor Tf1, the third frequency-division transistor Tf3, the first output transistor To1, and the fourth output transistor To4 are turned off. The fourth power supply terminal NVGH is electrically connected to the first output terminal Nout, and the pth-stage second gate control signal Pscan outputted by the second output terminal Pout has a low-level state.

In each of the (p+1)th-stage gate drive circuit GDC(p+1) to the (p+2)th-stage gate drive circuit GDC(p+2) and the (p+4)th-stage gate drive circuit GDC(p+4) to the (p+5)th-stage gate drive circuit GDC(p+5), the third transistor T3 is turned off, and therefore, the potential of the first node K1 and the potential of the third node P of each of the (p+1)th-stage gate drive circuit GDC(p+1) to the (p+2)th-stage gate drive circuit GDC(p+2) and the (p+4)th-stage gate drive circuit GDC(p+4) to the (p+5)th-stage gate drive circuit GDC(p+5) are kept in the same state as in the third phase t3. In the (p+3)th-stage gate drive circuit GDC(p+3), the first transistor T1 and the third transistor T3 are turned on, and the first power supply terminal PVGL is electrically connected to the first node K1. Thus, the (p+1)th-stage first gate control signal Nscan(p+1) to the (p+5)th-stage first gate control signal Nscan(p+5) maintain high-level states, and the (p+1)th-stage first gate control signal Nscan(p+1) to the (p+5)th-stage first gate control signal Nscan(p+5) maintains high-level states.

In the fourth phase t4, the (p+6)th-stage gate drive circuit GDC(p+6) performs the action(s) similar to that performed by the pth-stage gate drive circuit GDC(p) in the third phase t3. In the fourth phase t4, the (p+7)th-stage gate drive circuit GDC(p+7) performs the action(s) similar to that performed by the (p+1)th-stage gate drive circuit GDC(p+1) in the third phase t3. By analogy, the actions performed by the (p+8)th-stage gate drive circuit GDC(p+8) to the (p+q)th-stage gate drive circuit GDC(p+q) in the fourth phase t4 are obtained.

The fifth phase t5: A first clock signal CK1 has a high-level state, a second clock signal CK2 has a low-level state, a third clock signal CK3 has a high-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a low-level state.

In the pth-stage gate drive circuit GDC(p), the second transistor T2, the third transistor T3, the fifth transistor T5, the seventh transistor T7, the tenth transistor T10, the eleventh transistor T11, the thirteenth transistor T13, the first frequency-division transistor Tf1 to the fourth frequency-division transistor Tf4, the first output transistor To1, and the fourth output transistor To4 are turned on. The first transistor T1, the fourth transistor T4, the sixth transistor T6, the eighth transistor T8, the ninth transistor T9, the twelfth transistor T12, the second output transistor To2, and the third output transistor To3 are turned off. The third power supply terminal NVGL is electrically connected to the first output terminal Nout, and the second power supply terminal PVGH is electrically connected to the second output terminal Pout.

In the fifth phase t5, the (p+1)th-stage gate drive circuit GDC(p+1) performs the action(s) similar to that performed by the pth-stage gate drive circuit GDC(p) in the fourth phase t4 so that the (p+1)th-stage second gate control signal Pscan(p+1) has a low-level state. In the sixth phase t6, the (p+2)th-stage gate drive circuit GDC(p+2) performs the action(s) similar to that performed by the (p+1)th-stage gate drive circuit GDC(p+1) in the fourth phase t4. By analogy, the actions performed by the (p+3)th-stage gate drive circuit GDC(p+3) to the (p+q)th-stage gate drive circuit GDC(p+q) in the fifth phase t5 are obtained.

The sixth phase t6: A first clock signal CK1 has a high-level state, a second clock signal CK2 has a high-level state, a third clock signal CK3 has a low-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a low-level state.

In the pth-stage gate drive circuit GDC(p), the second transistor T2, the fourth transistor T4, the fifth transistor T5, the seventh transistor T7, the ninth transistor T9, the tenth transistor T10, the eleventh transistor T11, the twelfth transistor T12, the thirteenth transistor T13, the first frequency-division transistor Tf1 to the fourth frequency-division transistor Tf4, the first output transistor To1, and the fourth output transistor To4 are turned on. The first transistor T1, the third transistor T3, the sixth transistor T6, the eighth transistor T8, the second output transistor To2, and the third output transistor To3 are turned off. The third power supply terminal NVGL is electrically connected to the first output terminal Nout, and the second power supply terminal PVGH is electrically connected to the second output terminal Pout.

In the sixth phase t6, the (p+1)th-stage gate drive circuit GDC(p+1) performs the action(s) similar to that performed by the pth-stage gate drive circuit GDC(p) in the fifth phase t5 so that the (p+1)th-stage first gate control signal Nscan(p+1) has a low-level state. In the sixth phase t6, the (p+2)th-stage gate drive circuit GDC(p+2) performs the action(s) similar to that performed by the (p+1)th-stage gate drive circuit GDC(p+1) in the fifth phase t5 so that the (p+2)th-stage second gate control signal Pscan(p+2) has a low-level state. By analogy, the actions performed by the (p+3)th-stage gate drive circuit GDC(p+3) to the (p+q)th-stage gate drive circuit GDC(p+q) in the sixth phase t6 are obtained.

The seventh phase t7: A first clock signal CK1 has a high-level state, a second clock signal CK2 has a high-level state, a third clock signal CK3 has a high-level state, and a fourth clock signal CK4 has a low-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a high-level state, and the second frequency-division control signal PLF has a low-level state.

It the seventh phase t7, the pth-stage gate drive circuit GDC(p) maintains the same state as in the sixth phase t6. In the seventh phase t7, the (p+1)th-stage gate drive circuit GDC(p+1) performs the action(s) similar to that performed by the pth-stage gate drive circuit GDC(p) in the sixth phase t6. In the seventh phase t7, the (p+2)th-stage gate drive circuit GDC(p+2) performs the action(s) similar to that performed by the (p+1)th-stage gate drive circuit GDC(p+1) in the sixth phase t6. In the seventh phase t7, the (p+3)th-stage gate drive circuit GDC(p+3) performs the action(s) similar to that performed by the (p+2)th-stage gate drive circuit GDC(p+2) in the sixth phase t6 so that the (p+3)th-stage second gate control signal Pscan(p+3) has a low-level state. By analogy, the actions performed by the (p+4)th-stage gate drive circuit GDC(p+4) to the (p+9)th-stage gate drive circuit GDC(p+9) in the seventh phase t7 are obtained.

In the (p+10)th-stage gate drive circuit GDC(p+10), the first transistor T1, the third transistor T3, the sixth transistor T6, the eighth transistor T8, and the second output transistor To2 are turned on. The second frequency-division transistor Tf2, the fourth frequency-division transistor Tf4 are kept on. The second transistor T2, the fourth transistor T4, the fifth transistor T5, the seventh transistor T7, the ninth transistor T9, the tenth transistor T10, the eleventh transistor T11, the twelfth transistor T12, the thirteenth transistor T13, the first frequency-division transistor Tf1, the third frequency-division transistor Tf3, the first output transistor To1, the third output transistor To3, and the fourth output transistor To4 are turned off. The fourth power supply terminal NVGH is electrically connected to the first output terminal Nout, and the pth-stage second gate control signal Pscan outputted by the second output terminal Pout is kept in a high-level state.

In the (p+11)th-stage gate drive circuit GDC(p+11), the first transistor T1, the fourth transistor T4, the ninth transistor T9, the twelfth transistor T12, the first frequency-division transistor Tf1, the third frequency-division transistor Tf3, and the fourth frequency-division transistor Tf4 are turned on. The second transistor T2, the third transistor T3, the eleventh transistor T11, and the second frequency-division transistor Tf2 are turned off. Thus, the (p+11)th-stage first gate control signal Nscan(p+11) has a low-level state, and the (p+11)th-stage second gate control signal Pscan(p+11) has a high-level state.

In each of the (p+12)th-stage gate drive circuit GDC(p+12) to the (p+q)th-stage gate drive circuit GDC(p+q), the first frequency-division transistor Tf1, the third frequency-division transistor Tf3, and the fourth frequency-division transistor Tf4 are turned on, and the second frequency-division transistor Tf2 is turned off.

The eighth phase t8: A first clock signal CK1 has a low-level state, a second clock signal CK2 has a high-level state, a third clock signal CK3 has a high-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a high-level state, and the second frequency-division control signal PLF has a low-level state.

In the eighth phase t8, the pth-stage gate drive circuit GDC(p) maintains the same state as in the seventh phase t7. In the eighth phase t8, the (p+1)th-stage gate drive circuit GDC(p+1) performs the action(s) similar to that performed by the pth-stage gate drive circuit GDC(p) in the seventh phase t7. In the eighth phase t8, the (p+2)th-stage gate drive circuit GDC(p+2) performs the action(s) similar to that performed by the (p+1)th-stage gate drive circuit GDC(p+1) in the seventh phase t7. In the eighth phase t8, the (p+3)th-stage gate drive circuit GDC(p+3) performs the action(s) similar to that performed by the (p+2)th-stage gate drive circuit GDC(p+2) in the seventh phase t7. In the eighth phase t8, the (p+4)th-stage gate drive circuit GDC(p+4) performs the action(s) similar to that performed by the (p+3)th-stage gate drive circuit GDC(p+3) in the seventh phase t7 so that the (p+4)th-stage second gate control signal Pscan(p+4) has a low-level state. By analogy, the action(s) performed by the (p+5)th-stage gate drive circuit GDC(p+5) to the (p+9)th-stage gate drive circuit GDC(p+9) in the seventh phase t7 are obtained.

In the (p+10)th-stage gate drive circuit GDC(p+10), the first transistor T1, the fourth transistor T4, the sixth transistor T6, the eighth transistor T8, the ninth transistor T9, the twelfth transistor T12, and the second output transistor To2 are turned on. The second frequency-division transistor Tf2, the fourth frequency-division transistor Tf4 are kept on. The second transistor T2, the third transistor T3, the fifth transistor T5, the seventh transistor T7, the tenth transistor T10, the eleventh transistor T11, the thirteenth transistor T13, the first frequency-division transistor Tf1, the third frequency-division transistor Tf3, the first output transistor To1, the third output transistor To3, and the fourth output transistor To4 are turned off. The fourth power supply terminal NVGH is electrically connected to the first output terminal Nout, and the pth-stage second gate control signal Pscan outputted by the second output terminal Pout maintains in a high-level state.

In the (p+11)th-stage gate drive circuit GDC(p+11), the first transistor T1, the third transistor T3, the sixth transistor T6, the eighth transistor T8, and the fourth frequency-division transistor Tf4 are turned on. The fourth transistor T4, the fifth transistor T5, the seventh transistor T7, the ninth transistor T9, the tenth transistor T10, the eleventh transistor T11, the twelfth transistor T12, the thirteenth transistor T13, the first frequency-division transistor Tf1 to the third frequency-division transistor Tf3, and the first output transistor To1 to the fourth output transistor To4 are turned off so that the (p+11)th-stage first gate control signal Nscan(p+11) is kept in a low-level state, and the (p+11)th-stage second gate control signal Pscan(p+11) is kept in a high-level state.

In each of the (p+12)th-stage gate drive circuit GDC(p+12) to the (p+13)th-stage gate drive circuit GDC(p+13), the second transistor T2 is turned on and the third transistor T3 is turned off, and therefore, the (p+12)th-stage first gate control signal Nscan(p+12) and the (p+13)th-stage second gate control signal Pscan(p+13) maintain the same states as in the seventh phase t7, and the (p+12)th-stage second gate control signal Pscan(p+12) and the (p+13)th-stage second gate control signal Pscan(p+13) maintain the same states as in the seventh phase t7.

In the eighth phase t8, the (p+14)th-stage gate drive circuit GDC(p+14) performs the action(s) similar to that performed by the (p+13)th-stage gate drive circuit GDC(p+13) in the seventh phase t7. In the eighth phase t8, the (p+15)th-stage gate drive circuit GDC(p+15) performs the action(s) similar to that performed by the (p+14)th-stage gate drive circuit GDC(p+14) in the seventh phase t7. By analogy, the action(s) performed by the (p+16)th-stage gate drive circuit GDC(p+16) to the (p+q)th-stage gate drive circuit GDC(p+q) in the eighth phase t8 are obtained.

The ninth phase t9: A first clock signal CK1 has a high-level state, a second clock signal CK2 has a high-level state, a third clock signal CK3 has a low-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have a low-level state. The first frequency-division control signal NLF has a high-level state, and the second frequency-division control signal PLF has a low-level state.

In the ninth phase t9, the pth-stage gate drive circuit GDC(p) to the (p+3)th-stage gate drive circuit GDC(p+3) maintain the same states as in the eighth phase t8. The (p+4)th-stage first gate control signal Nscan(p+4) to the (p+8)th-stage first gate control signal Nscan(p+8) have low-level states. The (p+4)th-stage second gate control signal Pscan(p+4) to the (p+8)th-stage second gate control signal Pscan(p+8) have high-level states. In the ninth phase t9, the (p+9)th-stage gate drive circuit GDC(p+9) performs the action(s) similar to that performed by the (p+3)th-stage gate drive circuit GDC(p+3) in the eighth phase t8. In the ninth phase t9, the (p+10)th-stage gate drive circuit GDC(p+10) performs the action(s) similar to that performed by the (p+4)th-stage gate drive circuit GDC(p+4) in the eighth phase t8.

That is, in the (p+9)th-stage gate drive circuit GDC(p+9), the second transistor T2, the third transistor T3, the fifth transistor T5, the seventh transistor T7, the tenth transistor T10, the eleventh transistor T11, the thirteenth transistor T13, the first frequency-division transistor Tf1 to the fourth frequency-division transistor Tf4, the first output transistor To1, and the fourth output transistor To4 are turned on. The first transistor T1, the fourth transistor T4, the sixth transistor T6, the eighth transistor T8, the ninth transistor T9, the twelfth transistor T12, the second output transistor To2, and the third output transistor To3 are turned off. The third power supply terminal NVGL is electrically connected to the first output terminal Nout, and the second power supply terminal PVGH is electrically connected to the second output terminal Pout.

In the (p+10)th-stage gate drive circuit GDC, the second transistor T2, the fourth transistor T4, the sixth transistor T6, the eighth transistor T8, the ninth transistor T9, the eleventh transistor T11, the twelfth transistor T12, the second frequency-division transistor Tf2, the fourth frequency-division transistor Tf4, the second output transistor To2, and the third output transistor To3 are turned on. The first transistor T1, the third transistor T3, the fifth transistor T5, the seventh transistor T7, the tenth transistor T10, the thirteenth transistor T13, the first frequency-division transistor Tf1, the third frequency-division transistor Tf3, the first output transistor To1, and the fourth output transistor To4 are turned off. The fourth power supply terminal NVGH is electrically connected to the first output terminal Nout, and the (p+10)th-stage second gate control signal Pscan(p+10) outputted by the second output terminal Pout has a low-level state.

In each of the (p+11)th-stage gate drive circuit GDC(p+11) to the (p+12)th-stage gate drive circuit GDC(p+12), the second transistor T2 is turned on and the third transistor T3 is turned off, and therefore, the (p+11)th-stage first gate control signal Nscan(p+11) and the (p+12)th-stage first gate control signal Nscan(p+12) maintain the same states as in the eighth phase t8, and the (p+11)th-stage second gate control signal Pscan(p+11) and the (p+12)th-stage second gate control signal Pscan(p+12) maintain the same states as in the eighth phase t8. In the (p+11)th-stage gate drive circuit GDC(p+11), the eleventh transistor T11 and the third output transistor To3 are turned on.

In the ninth phase t9, the (p+13)th-stage gate drive circuit GDC(p+13) performs the action(s) similar to that performed by the (p+11)th-stage gate drive circuit GDC(p+11) in the eighth phase t8. In the ninth phase t9, the (p+14)th-stage gate drive circuit GDC(p+14) performs the action(s) similar to that performed by the (p+12)th-stage gate drive circuit GDC(p+12) in the eighth phase t8. By analogy, the actions performed by the (p+15)th-stage gate drive circuit GDC(p+15) to the (p+q)th-stage gate drive circuit GDC(p+q) in the ninth phase t9 are obtained.

The tenth phase t10: A first clock signal CK1 has a high-level state, a second clock signal CK2 has a high-level state, a third clock signal CK3 has a high-level state, and a fourth clock signal CK4 has a low-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a high-level state, and the second frequency-division control signal PLF has a low-level state.

In the tenth phase t10, the pth-stage gate drive circuit GDC(p) to the (p+9)th-stage gate drive circuit GDC(p+9) maintain the same states as in the ninth phase t9. In the tenth phase t10, the (p+10)th-stage gate drive circuit GDC(p+10) performs the action(s) similar to that performed by the (p+9)th-stage gate drive circuit GDC(p+9) in the ninth phase t9.

That is, in the (p+10)th-stage gate drive circuit GDC, the second transistor T2, the third transistor T3, the fifth transistor T5, the seventh transistor T7, the tenth transistor T10, the eleventh transistor T11, the thirteenth transistor T13, the first frequency-division transistor Tf1 to the fourth frequency-division transistor Tf4, the first output transistor To1, and the fourth output transistor To4 are turned on. The first transistor T1, the fourth transistor T4, the sixth transistor T6, the eighth transistor T8, the ninth transistor T9, the twelfth transistor T12, the second output transistor To2, and the third output transistor To3 are turned off. The third power supply terminal NVGL is electrically connected to the first output terminal Nout, and the second power supply terminal PVGH and the second output terminal Pout are electrically connected.

In the (p+11)th-stage gate drive circuit GDC(p+11), the second transistor T2, the fourth transistor T4, the sixth transistor T6, the eighth transistor T8, the ninth transistor T9, the eleventh transistor T11, the twelfth transistor T12, the fourth frequency-division transistor Tf4, and the third output transistor To3 are turned on. The first transistor T1, the third transistor T3, the fifth transistor T5, the seventh transistor T7, the tenth transistor T10, the thirteenth transistor T13, the first frequency-division transistor Tf1, the second frequency-division transistor Tf2, the third frequency-division transistor Tf3, the first output transistor To1, the second output transistor To2, and the fourth output transistor To4 are turned off. The (p+11)th-stage first gate control signal Nscan (p+11) maintains the state in the ninth phase t9, and the (p+11)th-stage second gate control signal Pscan(p+11) outputted by the second output terminal Pout has a low-level state.

In each of the (p+12)-stage gate drive circuit GDC to the (p+13)th-stage gate drive circuit GDC, the third transistor T3 is turned off, the (p+12)th-stage first gate control signal Nscan(p+12) and the (p+13)th-stage first gate control signal Nscan(p+13) maintain the same states as in the ninth phase t9, and the (p+12)th-stage second gate control signal Pscan (p+12) and the (p+13)th-stage second gate control signal Pscan(p+13) maintain the same states as in the ninth phase t9.

In the tenth phase t10, the (p+14)th-stage gate drive circuit GDC(p+14) performs the action(s) similar to that performed by the (p+13)th-stage gate drive circuit GDC(p+13) in the ninth phase t9. In the tenth phase t10, the (p+15)th-stage gate drive circuit GDC(p+15) performs the action(s) similar to that performed by the (p+14)th-stage gate drive circuit GDC(p+14) in the ninth phase t9. By analogy, the actions performed by the (p+15)th-stage gate drive circuit GDC(p+15) to the (p+q)th-stage gate drive circuit GDC(p+q) in the tenth phase t10 are obtained.

In the eleventh phase t11: The first clock signal CK1 has a low-level state, the second clock signal CK2 has a high-level state, the third clock signal CK3 has a high-level state, and the fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a high-level state, and the second frequency-division control signal PLF has a low-level state.

In the eleventh phase t11, the pth-stage gate drive circuit GDC(p) to the (p+10)th-stage gate drive circuit GDC(p+10) maintain the same states as in the tenth phase t10.

In the (p+11)th-stage gate drive circuit GDC(p+11), the second transistor T2, the third transistor T3, the fifth transistor T5, the seventh transistor T7, the tenth transistor T10, the eleventh transistor T11, the thirteenth transistor T13, the first frequency-division transistor Tf1, the third frequency-division transistor Tf3, the fourth frequency-division transistor Tf4, the first output transistor To1, and the fourth output transistor To4 are turned on. The first transistor T1, the fourth transistor T4, the sixth transistor T6, the eighth transistor T8, the ninth transistor T9, the twelfth transistor T12, the second frequency-division transistor Tf2, the second output transistor To2, and the third output transistor To3 are turned off. The third power supply terminal NVGL is electrically connected to the first output terminal Nout, and the second power supply terminal PVGH is electrically connected to the second output terminal Pout.

Thereafter, if the corresponding activation signals STV received by the first transistor T1 and the second transistor T2 of the gate drive circuit GDC at each stage are provided by the first output terminal Nout of the previous-stage gate drive circuit GDC, then in the (p+12)th-stage gate drive circuit GDC(p+12) to the (p+q)th-stage gate drive circuit GDC(p+q), because the corresponding activation signals STV received by the first transistor T1 and the second transistor T2 of the gate drive circuit GDC at each stage are both at low-level, therefore, the (p+12)th-stage first gate control signals Nscan(p+12) to the (p+q)th-stage first gate control signals Nscan(p+q) outputted by the (p+12)th-stage gate drive circuit GDC(p+12) to the (p+q)th-stage gate drive circuit GDC(p+q) maintain the low-level states, and the (p+12)th-stage second gate control signals Pscan(p+12) to the (p+q)th-stage second gate control signals Pscan(p+q) outputted by the (p+12)th-stage gate drive circuit GDC(p+12) to the (p+q)th-stage gate drive circuit GDC(p+q) maintain the high-level states.

If the activation signals STV received by the first transistor T1 and the second transistor T2 of the gate drive circuit GDC at each stage correspond to the potential of the third node P of the previous-stage gate drive circuit GDC, then in the (p+12)th-stage gate drive circuit GDC(p+12) to the (p+q)th-stage gate drive circuit GDC(p+q), the (p+12)th-stage first gate control signals Nscan(p+12) to the (p+q)th-stage first gate control signals Nscan(p+q) outputted by the (p+12)th-stage gate drive circuit GDC(p+12) to the (p+q)th-stage gate drive circuit GDC(p+q) maintain the low-level states, and the (p+12)th-stage second gate control signals Pscan(p+12) to the (p+q)th-stage second gate control signals Pscan(p+q) outputted by the (p+12)th-stage gate drive circuit GDC(p+12) to the (p+q)th-stage gate drive circuit GDC(p+q) may have corresponding level states with the corresponding second clock signals CK during some time periods.

Therefore, by controlling the first frequency-division control signal NLF, the level states of the gate control signals outputted by the plurality of gate drive circuits GDC may be controlled to facilitate implementation of the frequency-division region-partition setting of the display panel when the gate drive unit is applied to the display panel.

Figure 3C:
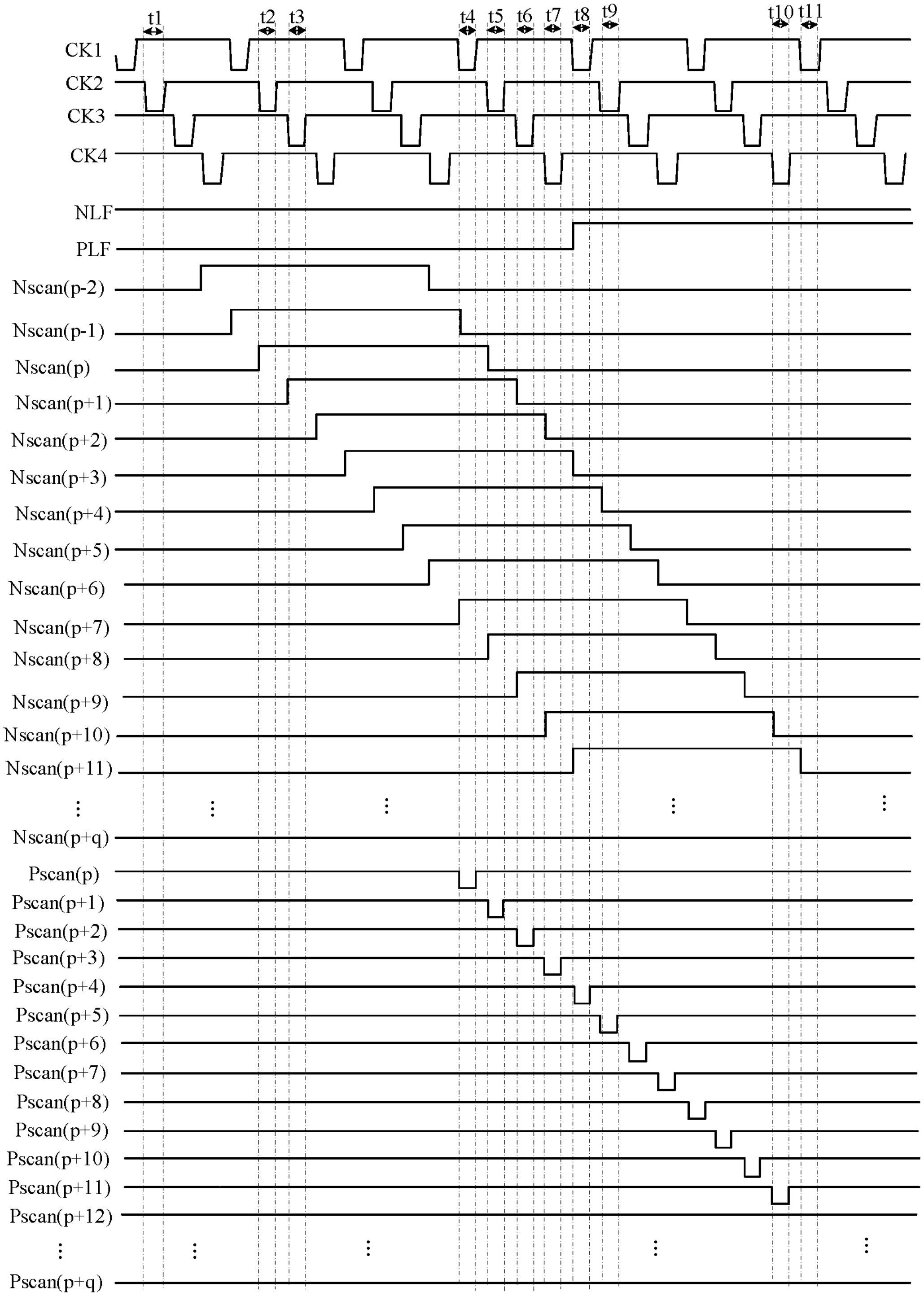
Figure 3D:
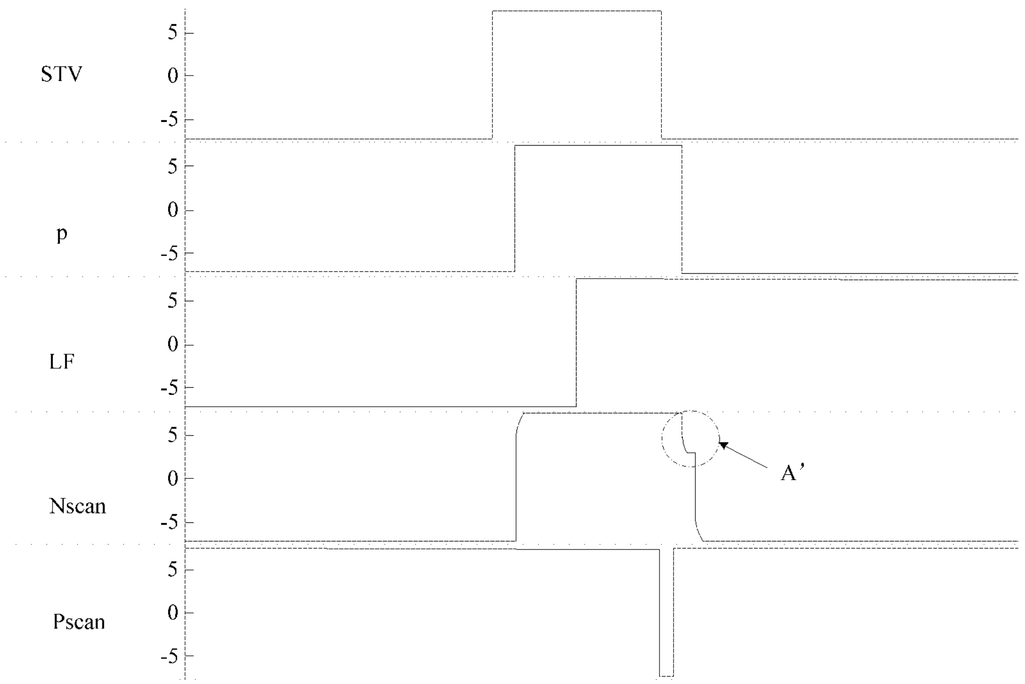

With reference to FIGS. 2D and 3C, a description will then be made by taking an example in which the second frequency-division control signal PLF has a transition from a low-level state to a high-level state in the pth-stage gate drive circuit GDC(p) to the (p+q)th-stage gate drive circuit GDC(p+q) of the corresponding gate drive unit.

Wherein, when the first frequency-division control signal NLF has a low-level state, and the second frequency-division control signal PLF has a low-level state, the operation principles of the pth-stage gate drive circuit GDC(p) to the (p+q)th-stage gate drive circuit GDC(p+q) corresponding to the first phase t1 to the sixth phase t6 may be obtained with reference to the description corresponding to the first phase t1 to the sixth phase t6 in FIGS. 2D and 3B. Therefore, starting from the seven phase t7, a description will be made of the transition of the second frequency-division control signal PLF from the low-level state to the high-level state in the pth-stage gate drive circuit GDC(p) to the (p+q)th-stage gate drive circuit GDC(p+q) of the corresponding gate drive unit.

The seventh phase t7: A first clock signal CK1 has a high-level state, a second clock signal CK2 has a high-level state, a third clock signal CK3 has a high-level state, and a fourth clock signal CK4 has a low-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a low-level state.

In each of the pth-stage gate drive circuit GDC(p) to the (p+1)th-stage gate drive circuit GDC(p+1), the third transistor T3, the pth-stage first gate control signal Nscan(p) to the (p+1)th-stage first gate control signal Nscan(p+1) have low-level states, and the pth-stage second gate control signal Pscan to the (p+1)th-stage second gate control signal Pscan (p+1) have high-level states.

In the seventh phase t7, the (p+2)th-stage gate drive circuit GDC(p+2) performs the action(s) similar to that performed by the (p+1)th-stage gate drive circuit GDC(p+1) in the sixth phase t6 so that the (p+2)th-stage first gate control signal Nscan(p+2) has a low-level state. In the seventh phase t7, the (p+3)th-stage gate drive circuit GDC (p+3) performs the action(s) similar to that performed by the (p+2)th-stage gate drive circuit GDC(p+2) in the sixth phase t6 so that the (p+3)th-stage second gate control signal Pscan(p+3) has a low-level state. By analogy, the actions performed by the (p+4)th-stage gate drive circuit GDC(p+4) to the (p+q)th-stage gate drive circuit GDC(p+q) in the seventh phase t7 are obtained.

The eighth phase t8: A first clock signal CK1 has a low-level state, a second clock signal CK2 has a high-level state, a third clock signal CK3 has a high-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a high-level state.

In the eighth phase t8, the pth-stage gate drive circuit GDC(p) to the (p+2)th-stage gate drive circuit GDC(p+2) maintain the same states as in the seventh phase t7. In the eighth phase t8, the (p+3)th-stage gate drive circuit GDC (p+3) performs the action(s) similar to that performed by the (p+2)th-stage gate drive circuit GDC(p+2) in the seventh phase t7 so that the (p+3)th-stage first gate control signal Nscan(p+3) has a low-level state. In the eighth phase t8, the (p+4)th-stage gate drive circuit GDC(p+4) performs the action(s) similar to that performed by the (p+3)th-stage gate drive circuit GDC(p+3) in the seventh phase t7 so that the (p+4)th-stage second gate control signal Pscan(p+4) has a low-level state. By analogy, the actions performed by the (p+5)th-stage gate drive circuit GDC(p+5) to the (p+10)th-stage gate drive circuit GDC(p+10) in the eighth phase t8 are obtained.

In the (p+11)th-stage gate drive circuit GDC(p+11), the first transistor T1, the third transistor T3, the sixth transistor T6, the eighth transistor T8, and the second output transistor To2 are turned on, the second frequency-division transistor Tf2, the fourth frequency-division transistor Tf4 are kept on, and the second transistor T2, the fourth transistor T4, the fifth transistor T5, the seventh transistor T7, the ninth transistor T9, the tenth transistor T10, the eleventh transistor T11, the twelfth transistor T12, the thirteenth transistor T13, the first frequency-division transistor Tf1, the third frequency-division transistor Tf3, the first output transistor To1, the third output transistor To3, and the fourth output transistor To4 are turned off. The fourth power supply terminal NVGH is electrically connected to the first output terminal Nout, and the pth-stage second gate control signal Pscan outputted by the second output terminal Pout maintains in a high-level state.

In the (p+12)th-stage gate drive circuit GDC(p+12), the first transistor T1, the fourth transistor T4, the ninth transistor T9, the twelfth transistor T12, the first frequency-division transistor Tf1 to the third frequency-division transistor Tf3 are turned on. The second transistor T2, the third transistor T3, the eleventh transistor T11, and the fourth frequency-division transistor Tf4 are turned off. Thus, the (p+12)th-stage first gate control signal Nscan(p+12) has a low-level state, and the (p+12)th-stage second gate control signal Pscan(p+12) has a high-level state.

In each of the (p+13)th-stage gate drive circuit GDC(p+13) to the (p+q)th-stage gate drive circuit GDC(p+q), the first frequency-division transistor Tf1 to the third frequency-division transistor Tf3 are turned on, and the fourth frequency-division transistor Tf4 is turned off.

In the ninth phase t9: A first clock signal CK1 has a high-level state, a second clock signal CK2 has a low-level state, a third clock signal CK3 has a high-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a high-level state.

In the ninth phase t9, the pth-stage gate drive circuits GDC(p) to (p+3)th-stage gate drive circuits GDC(p+3) maintain the same states as in the eighth phase t8. In the ninth phase t9, the (p+4)th-stage gate drive circuit GDC(p+4) performs the action(s) similar to that performed by the (p+3)th-stage gate drive circuit GDC(p+3) in the eighth phase t8 so that the (p+4)th-stage first gate control signal Nscan(p+4) has a low-level state. In the ninth phase t9, the (p+5)th-stage gate drive circuit GDC(p+5) performs the action(s) similar to that performed by the (p+4)th-stage gate drive circuit GDC(p+4) in the eighth phase t8 so that the (p+5)th-stage second gate control signal Pscan(p+5) has a low-level state. By analogy, the actions performed by the (p+6)th-stage gate drive circuit GDC(p+6) to the (p+10)th-stage gate drive circuit GDC(p+10) in the ninth phase t9 are obtained.

In the (p+11)th-stage gate drive circuit GDC(p+11), the first transistor T1, the fourth transistor T4, the sixth transistor T6, the eighth transistor T8, the ninth transistor T9, the twelfth transistor T12, and the second output transistor To2 are turned on, the second frequency-division transistor Tf2, the fourth frequency-division transistor Tf4 are kept on, and the second transistor T2, the third transistor T3, the fifth transistor T5, the seventh transistor T7, the tenth transistor T10, the eleventh transistor T11, the thirteenth transistor T13, the first frequency-division transistor Tf1, the third frequency-division transistor Tf3, the first output transistor To1, the third output transistor To3, and the fourth output transistor To4 are turned off. The fourth power supply terminal NVGH is electrically connected to the first output terminal Nout, and the pth-stage second gate control signal Pscan outputted by the second output terminal Pout is kept in a high-level state.

In the (p+12)th-stage gate drive circuit GDC(p+12), the first transistor T1, the third transistor T3, the sixth transistor T6, the eighth transistor T8, and the second frequency-division transistor Tf2 are turned on. The fourth transistor T4, the fifth transistor T5, the seventh transistor T7, the ninth transistor T9, the tenth transistor T10, the eleventh transistor T11, the twelfth transistor T12, the thirteenth transistor T13, the first frequency-division transistor Tf1, the third frequency-division transistor Tf3, the fourth frequency-division transistor Tf4, the first output transistor To1, the third output transistor To3, and the fourth output transistor To4 are turned off. The fourth power supply terminal NVGH is electrically connected to the first output terminal Nout, and the (p+12)th-stage second gate control signal Pscan(p+12) is kept in a high-level state.

In each of the (p+13)th-stage gate drive circuit GDC(p+13) to the (p+14)th-stage gate drive circuit GDC(p+14), the third transistor T3 is turned off, and therefore, the (p+13)th-stage first gate control signal Nscan(p+13) and the (p+14)th-stage second gate control signal Pscan(p+14) maintain the same states as in the ninth phase t9, and the (p+13)th-stage second gate control signal Pscan(p+13) and the (p+14)th-stage second gate control signal Pscan(p+14) maintain the same states as in the ninth phase t9.

In the ninth phase t9, the (p+15)th-stage gate drive circuit GDC(p+15) performs the action(s) similar to that performed by the (p+14)th-stage gate drive circuit GDC(p+14) in the eighth phase t8. In the ninth phase t9, the (p+16)th-stage gate drive circuit GDC(p+16) performs the action(s) similar to that performed by the (p+15)th-stage gate drive circuit GDC(p+15) in the eighth phase t8. By analogy, the actions performed by the (p+17)th-stage gate drive circuit GDC(p+17) to the (p+q)th-stage gate drive circuit GDC(p+q) in the ninth phase t9 are obtained.

The tenth phase t10: A first clock signal CK1 has a high-level state, a second clock signal CK2 has a high-level state, a third clock signal CK3 has a high-level state, and a fourth clock signal CK4 has a low-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a high-level state.

In the tenth phase t10, the pth-stage gate drive circuit GDC(p) to (p+4)th-stage gate drive circuit GDC(p+4) maintain the same states as in the ninth phase t9. The (p+5)th-stage first gate control signal Nscan(p+5) to the (p+9)th-stage first gate control signal Nscan(p+9) have low-level states, and the (p+5)th-stage second gate control signal Pscan(p+5) to the (p+9)th-stage second gate control signal Pscan(p+9) have high-level states. In the tenth phase t10, the (p+10)th-stage gate drive circuit GDC(p+10) performs the action(s) similar to that performed by the (p+4)th-stage gate drive circuit GDC(p+4) in the ninth phase t9 so that the (p+10)th-stage first gate control signal Nscan(p+10) has a low-level state. In the ninth phase t9, the (p+11)th-stage gate drive circuit GDC(p+11) performs the action(s) similar to that performed by the (p+5)th-stage gate drive circuit GDC (p+5) in the ninth phase t9 so that the (p+11)th-stage second gate control signal Pscan(p+11) has a low-level state.

That is, in the (p+11)th-stage gate drive circuit GDC, the second transistor T2, the fourth transistor T4, the sixth transistor T6, the eighth transistor T8, the ninth transistor T9, the eleventh transistor T11, the twelfth transistor T12, the second frequency-division transistor Tf2, the fourth frequency-division transistor Tf4, the second output transistor To2, and the third output transistor To3 are turned on. The first transistor T1, the third transistor T3, the fifth transistor T5, the seventh transistor T7, the tenth transistor T10, the thirteenth transistor T13, the first frequency-division transistor Tf1, the third frequency-division transistor Tf3, the first output transistor To1, and the fourth output transistor To4 are turned off. The fourth power supply terminal NVGH is electrically connected to the first output terminal Nout, and the (p+11)th-stage second gate control signal Pscan(p+11) outputted by the second output terminal Pout has a low-level state.

In each of the (p+12)th-stage gate drive circuit GDC(p+12) to the (p+13)th-stage gate drive circuit GDC(p+13), the third transistor T3 is turned off. The (p+12)th-stage first gate control signal Nscan(p+12) and the (p+13)th-stage first gate control signal Nscan(p+13) maintain the same states as in the ninth phase t9, and the (p+12)th-stage second gate control signal Pscan(p+12) and the (p+13)th-stage second gate control signal Pscan(p+13) maintain the same states as in the ninth phase t9. In the (p+12)th-stage gate drive circuit GDC(p+12), the eleventh transistor T11 is turned on.

In the tenth phase t10, the (p+14)th-stage gate drive circuit GDC(p+14) performs the action(s) similar to that performed by the (p+8)th-stage gate drive circuit GDC(p+8) in the ninth phase t9. In the tenth phase t10, the (p+15)th-stage gate drive circuit GDC(p+15) performs the action(s) similar to that performed by the (p+9)th-stage gate drive circuit GDC(p+9) in the ninth phase t9. By analogy, the actions performed by the (p+16)th-stage gate drive circuit GDC(p+16) to the (p+q)th-stage gate drive circuit GDC(p+q) in the tenth phase t10 are obtained.

In the eleventh phase t11: A first clock signal CK1 has a low-level state, a second clock signal CK2 has a high-level state, a third clock signal CK3 has a high-level state, and a fourth clock signal CK4 has a high-level state. The (p−1)th-stage first gate control signal Nscan(p−1) outputted by the (p−1)th-stage gate drive circuit GDC(p−1) to the (p−2)th-stage first gate control signal Nscan(p−2) outputted by the (p−2)th-stage gate drive circuit GDC(p−2) have low-level states. The first frequency-division control signal NLF has a low-level state, and the second frequency-division control signal PLF has a high-level state.

In the eleventh phase t11, the pth-stage gate drive circuit GDC(p) to the (p+10)th-stage gate drive circuit GDC(p+10) maintain the same states as in the tenth phase t10. In the eleventh phase t11, the (p+11)th-stage gate drive circuit GDC(p+11) performs the action(s) similar to that performed by the (p+10)th-stage gate drive circuit GDC(p+10) in the tenth phase t10 so that the (p+11)th-stage first gate control signal Nscan(p+11) has a low-level state.

In the (p+12)th-stage gate drive circuit GDC(p+12), the (p+11)th-stage first gate control signal Nscan(p+11) maintains the state in the tenth phase t10. Since the fourth frequency-division transistor Tf4 is turned off, the (p+11)th-stage second gate control signal Pscan(p+11) maintains the state in the tenth phase t10.

Similarly, the operation principles of the (p+13)th-stage gate drive circuit GDC(p+13) to the (p+q)th-stage gate drive circuit GDC(p+q) corresponding to the eleventh phase t11 may be obtained.

By analogy, after the eleventh phase t11, the operation principles corresponding to the pth-stage gate drive circuit GDC(p) to the (p+q)th-stage gate drive circuit GDC(p+q) may be obtained with reference to the descriptions of the seventh phase t7 to the eleventh phase t11.

It will be appreciated that the timing of level change of the first frequency-division control signal NLF may be the same as or different from the timing of level change of the second frequency-division control signal PLF.

It will be appreciated that the operation principles of the first frequency-division control signal NLF and the second frequency-division control signal PLF when the pth-stage gate drive circuit GDC(p) to the (p+q)th-stage gate drive circuit GDC(p+q) of the corresponding gate drive unit each have a transition from a low-level state to a high-level state may be obtained with reference to the operation principles of FIGS. 2D and 3B-3C.

It will be appreciated that by adjusting the timing of level state change of the first frequency-division control signal NLF, it is possible to control the first gate control signals Nscan at multiple stages to have no active pulse starting from corresponding different stages. By adjusting the timing of level state change of the second frequency-division control signal PLF, it is possible to control the second gate control signals Pscan at multiple stages to have no active pulse starting from corresponding different stages.

It will be appreciated that by adjusting the position of the timing of level state change of the first frequency-division control signal NLF with respect to the timing of level state change of the second frequency-division control signal PLF, the display panel to which the gate drive unit is applied may be subject to frequency reduction at different positions in correspondence to the first gate control signal Nscan and the second gate control signal Pscan.

As can be seen from the operation principles analyzed in accordance with FIGS. 2A-2C and 3A, the control of level states of the gate control signals is realized by applying the gate drive circuits GDC shown in FIG. 2A-2C in coordination with the frequency-division control signal LF. When the level state of the frequency-division control signal LF changes, the transition is realized by a portion of the gate drive circuits GDC(for example, after the sixth phase t6, the (p+1)th-stage first gate control signal Nscan(p+1) to the (p+8)th-stage first gate control signal Nscan(p+8) always maintain in high-level states. Accordingly, the (p+1)th-stage second gate control signal Pscan(p+1) to the (p+8)th-stage second gate control signal Pscan(p+8) correspond to the states of the corresponding second clock signals CK), so that the gate control signals outputted by the subsequent gate drive circuits GDC(e.g., the (p+9)th-stage gate drive circuit GDC(p+9) to the (p+q)th-stage gate drive circuit GDC(p+q)) have no pulses.

As can be seen from the operation principles analyzed in accordance with FIGS. 2D and 3B-3C, the gate drive circuit GDC shown in FIG. 2D is used in coordination with the two frequency-division control signals LF to control level states of the gate control signals, so that the first gate control signals Nscan at multiple stages, which are outputted by the gate drive unit, are no longer always in the high-level states, and the second gate control signals at multiple stages, which are outputted by the gate drive unit, no longer always correspond to the states of the second clock signals CK, thereby solving the problem occurring in the adoption of the gate drive circuits GDC shown in FIGS. 2A-2C (that is, the (p+1)th-stage first gate control signal Nscan(p+1) to the (p+8)th-stage first gate control signal Nscan(p+8) are always kept in the high-level states after the sixth phase t6. Accordingly, the (p+1)th-stage second gate control signals Pscan (p+1) to (p+8)th-stage second gate control signals Pscan(p+8) correspond to the states of the corresponding second clock signals CK).

In addition, when level states of the gate control signals are controlled by the gate drive circuit GDC shown in FIGS. 2A-2C in coordination with the frequency-division control signal LF, after the level state of the frequency-division control signal LF transitions, the first gate control signals Nscan at multiple stages are caused to have a step problem (as indicated by A' in FIG. 3D) because the capacitance value of the first capacitor C1 is large and the first switching transistor Ts1 is not sufficiently turned on, and the number of continuous stages is equal to the number of row cycles in which the first gate control signal Nscan maintains in high level. With application of the gate drive circuit GDC shown in FIG. 2D, the step problem of the first gate control signal(s) Nscan may be solved.

When the gate drive circuits GDC shown in FIGS. 2A-2C are applied to the display panel to realize low-frequency control, the potential of the third node P may be used as the activation signal STV of the gate drive circuit(s) GDC at the corresponding stage(s), so that the potential of the third node P may correspond to the function of a stage-transmission signal, thereby realizing frequency reduction of any region of the display panel.

Optionally, in some embodiments, when level states of the gate control signals are controlled by the gate drive circuits GDC shown in FIGS. 2A-2C in coordination with the frequency-division control signal LF, the first clock signal CK1 to the fourth clock signal CK4 may be controlled to be in high-level states while the first gate control signals Nscan and the second gate control signals Pscan outputted by the gate drive circuits GDC at multiple stages that are controlled by the frequency division control signal LF do not have active pulses to output (as shown in FIG. 3A, after the ninth phase t9) thereby reducing power consumption.

The present disclosure also provides a display device including a gate drive unit as described above.

Figure 4:
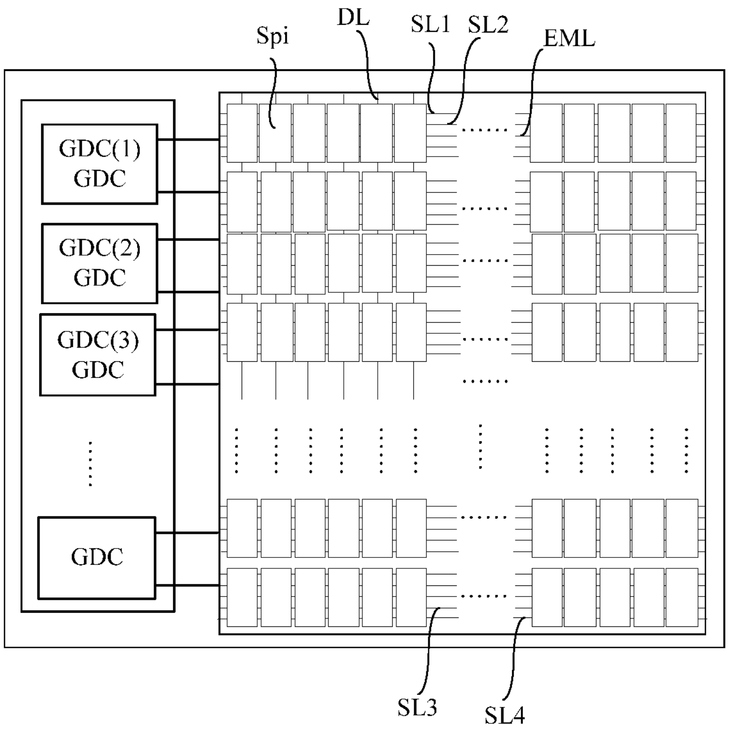
FIG. 4 is a schematic structural diagram of a display device according to an embodiment of the present disclosure.

FIG. 4 is a schematic structural diagram of a display device according to an embodiment of the present disclosure. The display device includes a display panel and a gate drive unit.

The display panel includes a plurality of sub-pixels Spi, a plurality of scan lines and a plurality of data lines DL electrically connected between the gate drive unit and the plurality of sub-pixels Spi, the plurality of data lines DL being configured to transmit a plurality of data signals.

Optionally, the plurality of scan lines includes a plurality of first scan lines SL1 electrically connected between first output terminals Nout of the plurality of gate drive circuits GDC and the plurality of sub-pixels Spi, and a plurality of second scan lines SL2 electrically connected between second output terminals Pout of the plurality of gate drive circuits GDC and the plurality of sub-pixels Spi, the plurality of first scan lines SL1 being configured to transmit a plurality of first gate control signals Nscan, and the plurality of second scan lines SL2 configured to transmit a plurality of second gate control signals Pscan.

Each of the sub-pixel Spi includes a light-emitting device Di and a pixel drive circuit for driving the light-emitting device Di to emit light.

Optionally, the light-emitting device Di includes an organic light-emitting diode, a sub-millimeter light-emitting diode, a micro light-emitting diode, or the like.

Figure 5:
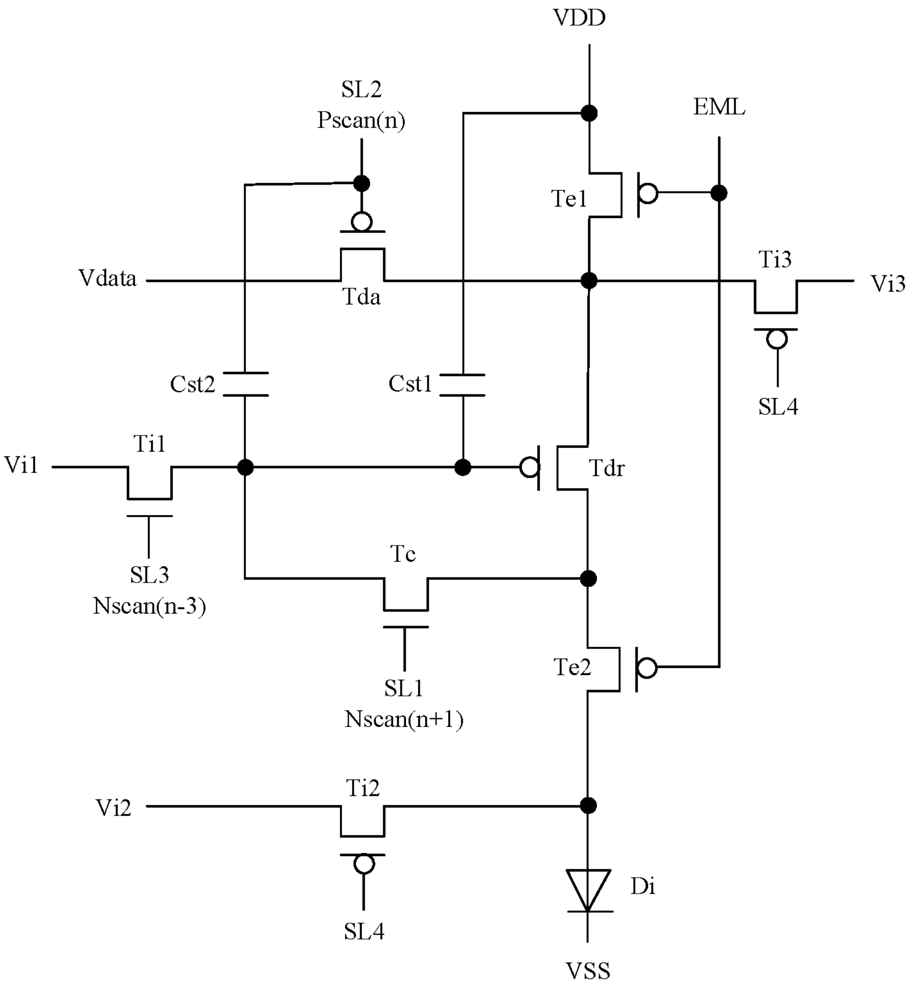
FIG. 5 is a schematic structural diagram of a pixel drive circuit according to an embodiment of the present disclosure.

FIG. 5 is a schematic structural diagram of a pixel drive circuit according to an embodiment of the present disclosure.

The pixel drive circuit includes at least a drive transistor Tdr, a data transistor Tda, and a compensation transistor Tc.

The drive transistor Tdr and the light-emitting device Di are connected in series between a first voltage terminal VDD and a second voltage terminal VSS, and the drive transistor Tdr is configured to generate a driving current to drive the light-emitting device Di to emit light according to a data signal Vdata transmitted through a corresponding data line DL.

An input terminal of the compensation transistor Tc is electrically connected to an output terminal of the drive transistor Tdr. An output terminal of the compensation transistor Tc is electrically connected to a control terminal of the drive transistor Tdr.

An input terminal of the data transistor Tda is electrically connected to a corresponding data line DL. The input terminal of the data transistor Tda is configured to receive a corresponding data signal Vdata. An output terminal of the data transistor Tda is electrically connected to an input terminal of the drive transistor Tdr.

Wherein the first gate control signals Nscan generated by the plurality of gate drive circuits GDC are outputted to the control terminals of the compensation transistors Tc of the plurality of sub-pixels Spi via the plurality of first scan lines SL1. The second gate control signals Pscan generated by the plurality of gate drive circuits GDC are outputted to the control terminals of the data transistors Tda of the plurality of sub-pixels Spi via the plurality of second scan lines SL2.

The data transistors Tda and the compensation transistors Tc of the plurality of sub-pixels Spi are controlled by the first gate control signals Nscan and the second gate control signals Pscan outputted by the gate drive unit so as to control the turn-on condition(s) of at least one of the corresponding data transistor(s) Tda and compensation transistor(s) Tc at the position(s) of the display panel which require(s) frequency-division, thereby controlling whether contents displayed by the corresponding sub-pixel(s) Spi change(s) or not, so as to enable the display panel to realize region-partition frequency-division display.

Optionally, the compensation transistors Tc include an oxide transistor or a silicon transistor.

Optionally, the compensation transistors Tc are P-type transistors or N-type transistors, and the data transistors Tda are P-type transistors or N-type transistors.

Optionally, in the gate drive unit, the voltage corresponding to the second power supply terminal PVGH is greater than the voltage corresponding to the first power supply terminal PVGL. The voltage corresponding to the fourth power supply terminal NVGH is greater than the voltage corresponding to the third power supply terminal NVGL. The compensation transistors Tc are N-type transistors, and the data transistors Tda are P-type transistors.

Optionally, the plurality of scan lines further includes a plurality of third scan line SL3. Still referring to FIG. 5, the pixel drive circuit includes a first reset transistor Ti1. A control terminal of the first reset transistor Ti1 is electrically connected to a corresponding third scan line SL3, an input terminal of the first reset transistor Ti1 is configured to receive a first reset signal Vi1, and an output terminal of the first reset transistor Ti1 is electrically connected to the control terminal of the drive transistor Tdr. The first reset transistor Ti1 is configured to transmit the first reset signal Vi1 to the control terminal of the drive transistor Tdr so as to reset the potential of the control terminal of the drive transistor Tdr.

Optionally, in some embodiments, the first gate control signals Nscan generated by the plurality of gate drive circuits GDC are outputted to the control terminals of the first reset transistors Ti1 of the plurality of sub-pixels Spi via the plurality of first scan lines SL1. The second gate control signals Pscan generated by the plurality of gate drive circuits GDC are outputted to the control terminals of the data transistors Tda of the plurality of sub-pixels Spi via the plurality of second scan lines SL2 so that the data transistors Tda and the first reset transistors Ti1 of the plurality of sub-pixels Spi are controlled by the first gate control signals Nscan and the second gate control signals Pscan outputted by the gate drive unit so as to control whether content(s) displayed by the corresponding sub-pixel(s) Spi change(s) or not at the position(s) of the display panel which require(s) frequency-division so as to enable the display panel to realize region-partition frequency-division display.

Optionally, in some embodiments, the plurality of third scan lines SL3 are electrically connected between the control terminals of the first reset transistors Ti1 of the plurality of sub-pixels Spi and the first output terminals Nout of the gate drive unit so that the first gate control signals Nscan generated by the plurality of gate drive circuits GDC are outputted to the control terminals of the compensation transistors Tc of the plurality of sub-pixels Spi via the plurality of first scan lines SL1, and the second gate control signals Pscan generated by the plurality of gate drive circuits GDC are outputted to the control terminals of the data transistors Tda of the plurality of sub-pixels Spi via the plurality of second scan lines SL2, the first gate control signals Nscan generated by the plurality of gate drive circuits GDC are outputted to the control terminals of the first reset transistors Ti1 of the plurality of sub-pixels Spi via the plurality of third scan lines SL3 so as to enable the display panel to realize region-partition frequency-division display by controlling the data transistors Tda, the first reset transistors Ti1, and the compensation transistors Tc of the plurality of sub-pixels Spi to be controlled by the first gate control signals Nscan and the second gate control signals Pscan outputted by the gate drive unit.

Optionally, when both the first reset transistors Ti1 and the compensation transistors Tc are controlled by the first gate control signals Nscan of the gate drive unit, the orders of stages of the first gate control signals Nscan received at the control terminals of the first reset transistors Ti1 and the control terminals of the compensation transistors Tc are different. For example, the control terminal of the first reset transistor Ti1 of the sub-pixel Spi located in the nth row receives the (n-D)th-stage first gate control signal Nscan, and the control terminal of the compensation transistor Tc of the sub-pixel Spi located in the nth row receives the (n+E)th-stage first gate control signal Nscan. Wherein, $D \geq 1$, $E \geq 1$.

Optionally, the second gate control signals Pscan received at the control terminals of the data transistors Tda and the first gate control signals Nscan received at the control terminals of the compensation transistors Tc are provided by different gate drive circuits GDC. For example, the control terminal of the data transistor Tda of the sub-pixel Spi located in the nth row receives the nth-stage second gate control signal Pscan, and the control terminal of the compensation transistor Tc of the sub-pixel Spi located in the nth row receives the (n+E)th-stage first gate control signal Nscan.

Optionally, the control terminal of the first reset transistor Ti1 of the sub-pixel Spi located in the nth row receives the (n−3)th-stage first gate control signal Nscan(n−3), the control terminal of the compensation transistor Tc of the sub-pixel Spi located in the nth row receives the (n+1)th-stage first gate control signal Nscan(n+1), and the control terminal of the data transistor Tda of the sub-pixel Spi located in the nth row receives the nth-stage second gate control signal Pscan(n).

With continued reference to FIG. 5, the pixel drive circuit of each sub-pixel Spi further includes a second reset transistor Ti2 having an input terminal configured to receive a second reset signal Vi2, and an output terminal electrically connected to an anode of the light-emitting device Di. The second reset transistor Ti2 is configured to transmit the second reset signal Vi2 to the anode of the light-emitting device Di to initialize the anode potential of the light-emitting device Di.

Optionally, in some embodiments, a control terminal of the second reset transistor Ti2 may be controlled by the second gate control signal Pscan. Optionally, the control terminals of the second reset transistors Ti2 are electrically connected to the control terminals of the data transistors Tda so as to be electrically connected to the second output terminals Pout of the corresponding gate drive circuits GDC through the plurality of second scan lines SL2, so that the second reset transistors Ti2 are also controlled by the second gate control signals Pscan.

Optionally, in some embodiments, the control terminals of the second reset transistors Ti2 may be controlled by the first gate control signals Nscan. Optionally, the second reset transistors Ti2 and the compensation transistors Tc are both N-type transistors or P-type transistors. The control terminals of the second reset transistors Ti2 are electrically connected to the control terminals of the compensation transistor Tc so as to be electrically connected to the first output terminals Nout of the corresponding gate drive circuits GDC through the plurality of third scan lines SL3, so that the second reset transistors Ti2 are also controlled by the first gate control signals Nscan.

Optionally, the pixel drive circuit of each sub-pixel Spi further includes a light-emitting control transistor electrically connected between the input terminal of the drive transistor Tdr and the first voltage terminal VDD, and/or electrically connected between the output terminal of the drive transistor Tdr and the light-emitting device Di.

Optionally, with continued reference to FIG. 4, the display panel includes a plurality of light-emission control lines EML configured to transmit a plurality of light-emission control signals EMA.

Optionally, there are light-emitting control transistors including a first light-emitting control transistor Te1 having an input terminal and an output terminal electrically connected between the first voltage terminal VDD and the input terminal of the drive transistor Tdr, and a second light-emitting control transistor Te2 having an input terminal and an output terminal electrically connected between the light-emitting device Di and the output terminal of the drive transistor Tdr. The control terminals of the first light-emitting control transistor Te1 and the second light-emitting control transistor Te2 are electrically connected to the corresponding light-emitting control lines EML. The first light-emitting control transistor Te1 and the second light-emitting control transistor Te2 are configured to control the light-emitting period(s) of the light-emitting device Di according to the light-emitting control signal(s) EMA transmitted through the corresponding light-emitting control line(s) EML.

Optionally, the pixel drive circuit of each sub-pixel Spi further includes a fourth capacitor Cst1 connected in series between the first voltage terminal VDD and the control terminal of the drive transistor Tdr.

Optionally, in some embodiments, the pixel drive circuit of each sub-pixel Spi further includes a fifth capacitor Cst2 connected in series between the control terminal of the drive transistor Tdr and the control terminal of the data transistor Tda.

Optionally, in some embodiments, the plurality of scan lines further includes a plurality of fourth scan lines SL4. The pixel drive circuit of each sub-pixel Spi further includes a third reset transistor Ti3. A control terminal of the third reset transistor Ti3 is electrically connected to a corresponding fourth scan line SL4, an input terminal of the third reset transistor Ti3 is configured to receive a third reset signal Vi3, and an output terminal of the third reset transistor Ti3 is electrically connected to the input terminal of the drive transistor Tdr. The third reset transistor Ti3 is configured to transmit the third reset signal Vi3 to the input terminal of the drive transistor Tdr to reset the potential of the input terminal of the drive transistor Tdr.

Optionally, the control terminal of the second reset transistor Ti2 is electrically connected to the control terminal of the third reset transistor Ti3 so that the second reset transistor Ti2 and the third reset transistor Ti3 are controlled by a same reset control signal EMB to realize synchronous reset of the potential of the anode of the light-emitting device Di and a potential of the input of the drive transistor Tdr.

Optionally, in some embodiments, the display panel further includes a first gate drive unit and a second gate drive unit. The first gate drive unit includes a plurality of first gate drive circuits electrically connected to a plurality of sub-pixels Spi through a plurality of light-emitting control lines EML. The plurality of first gate drive circuits are configured to generate a plurality of light-emitting control signals EMA. The plurality of second gate drive units include a plurality of second gate drive circuits electrically connected to the control terminals of the third reset transistors Ti3 of the plurality of sub-pixels Spi through a plurality of fourth scan lines SL4. The plurality of second gate drive circuits GDC are configured to generate a plurality of reset control signals EMB.

Wherein, the first gate drive circuits configured to generate the light-emission control signals EMA and the second gate drive circuits configured to generate the reset control signals EMB may be designed with reference to a conventional circuit structure in the art, and will not be described in detail herein.

Optionally, in some embodiments, the display panel includes a display region and a non-non-display region located on a side of the display region. Wherein the gate drive unit, the first gate drive unit, and the second gate drive unit are located in the non-display region.

Figure 6A:
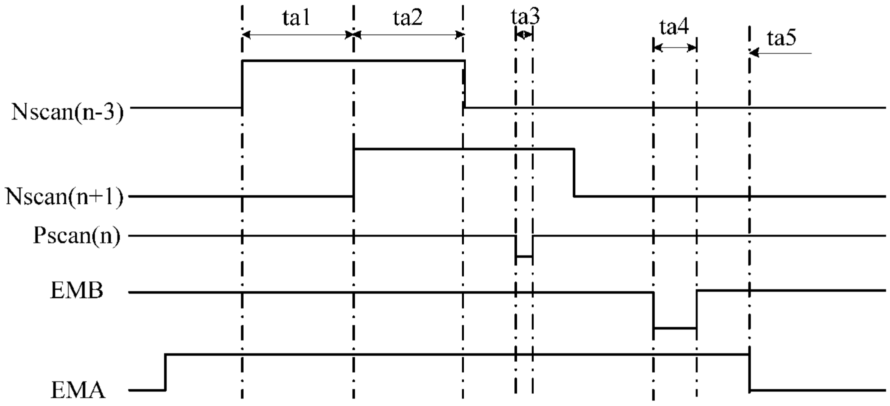
FIGS. 6A-6C are timing diagrams corresponding to a display device according to an embodiment of the present disclosure.
Figure 6B:
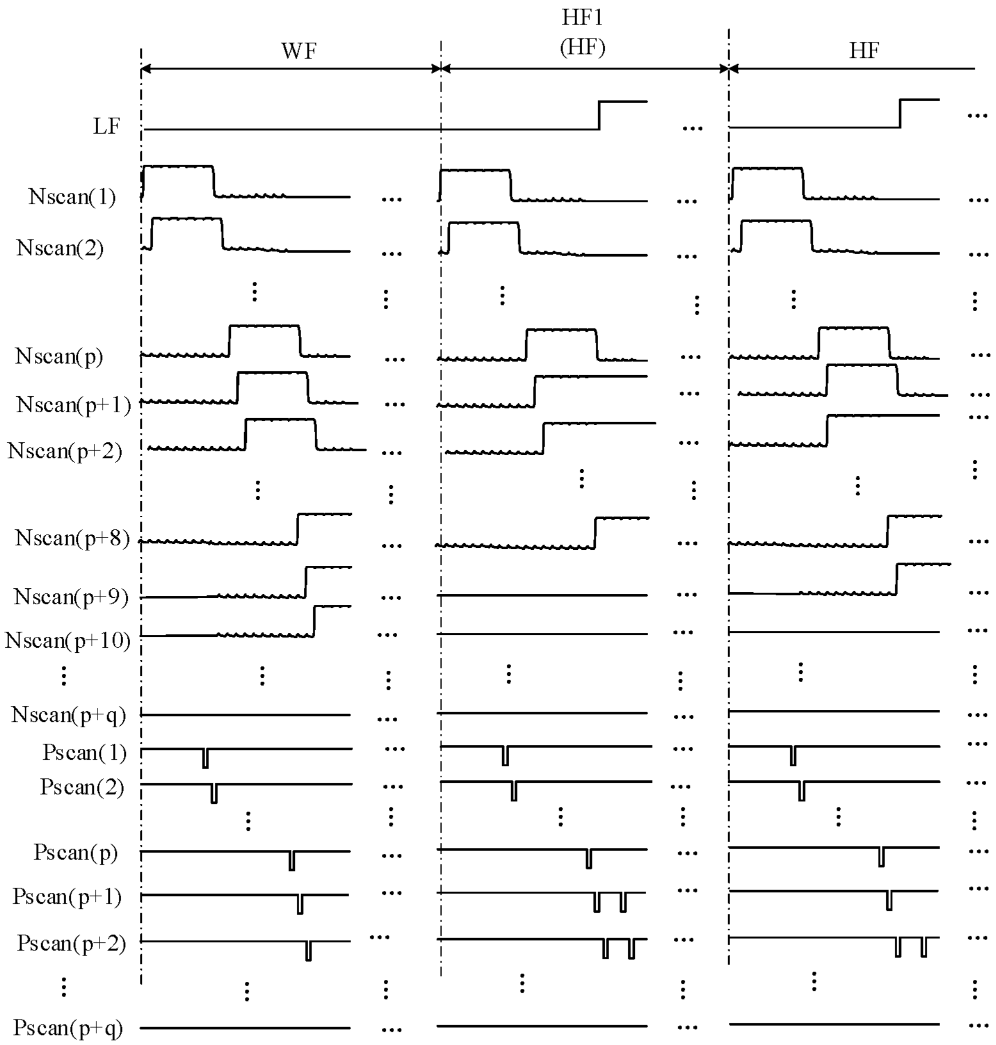
Figure 6C:
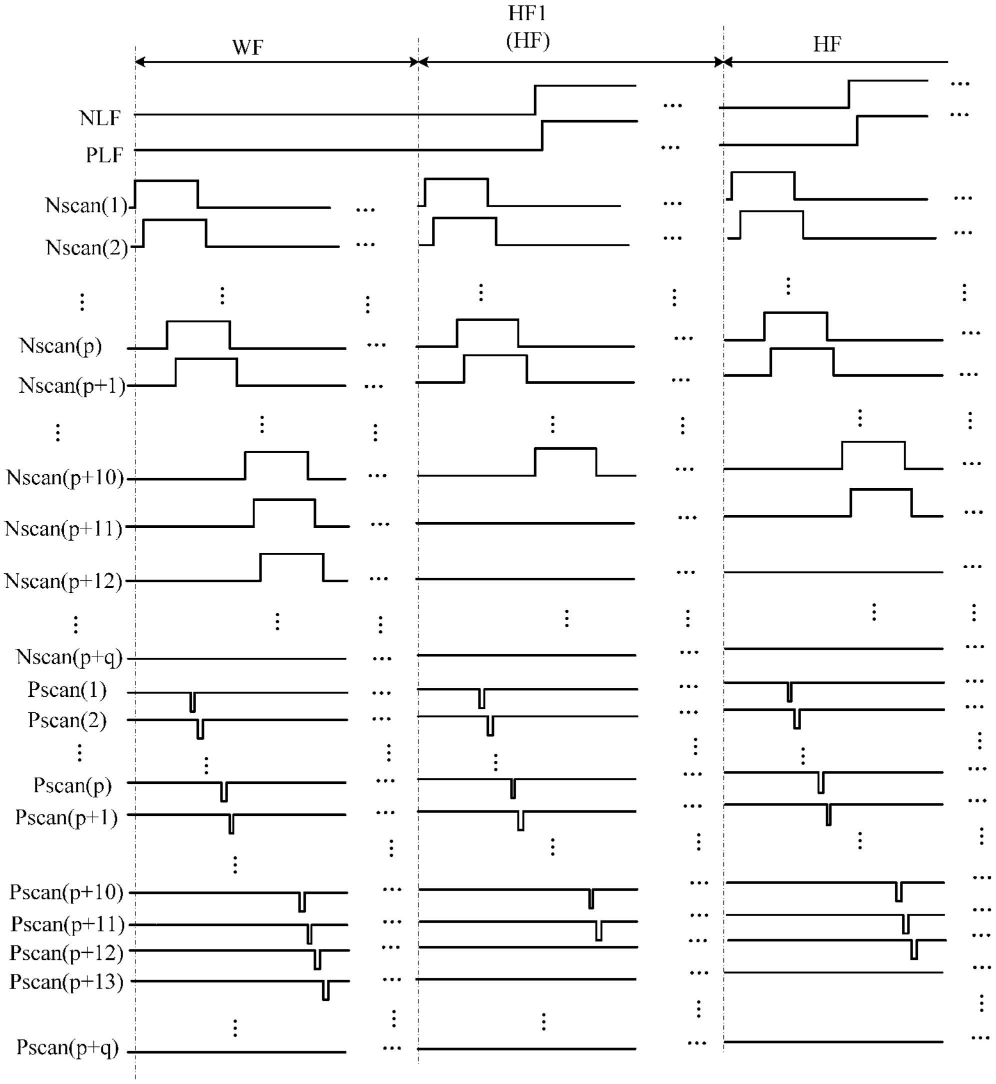

FIGS. 6A-6C are timing diagrams corresponding to a display device according to an embodiment of the present disclosure. With continued reference to FIGS. 4-5, and 6A-6C, when a display panel performs display, a write frame WF and at least one hold frame HF may be included in one display cycle.

In the write frame WF, when a plurality of sub-pixels Spi are controlled by the gate drive unit shown in FIGS. 2A-2C, the frequency-division control signal LF has an active level state (that is, a level state in which the frequency-division transistor Tf is controlled to be turned on) in order to enable the display panel to update the screens. When the plurality of sub-pixels Spi are controlled by the gate drive unit shown in FIG. 2D, both the first frequency-division control signal NLF and the second frequency-division control signal PLF have active level states.

In the blanking interval after the write frame WF or in the at least one hold frame HF after the write frame WF, in order to keep the screen of a portion of rows of the display panel the same as the display screen during the write frame WF, when the plurality of sub-pixels Spi are controlled by the gate drive unit shown in FIGS. 2A-2C, the frequency-division control signal LF has a transition from an active level state to an inactive level state (that is, a level state in which the frequency-division transistor Tf is controlled to be turned off). When the plurality of sub-pixels Spi are controlled by the gate drive unit shown in FIG. 2D, at least one of the first frequency-division control signal NLF and the second frequency-division control signal PLF has a transition from an active level state to an inactive level state, so that a portion of the gate control signals generated by the gate control unit does not have active pulses.

Optionally, the blanking interval includes a horizontal blanking interval and a vertical blanking interval.

Optionally, when the gate drive unit shown in FIGS. 2A-2C is used in the display panel, the frequency-division control signal LF corresponds to each hold frame HF, and the timing at which the active level state transitions to the inactive level state may be the same or different. When the gate drive unit shown in FIG. 2D is used in the display panel, the first frequency-division control signal NLF corresponds to each hold frame HF, and the timing at which the active level state transitions to the inactive level state may be the same or different; the second frequency-division control signal PLF corresponds to each hold frame HF, and the timing at which the active level state transitions to the inactive level state may be the same or different.

Because the first gate control signals Nscan and the second gate control signals Pscan generated by a portion of the gate drive circuits GDC may be correspondingly controlled to not have active pulses while the frequency-division control signal LF, the first frequency-division control signal NLF, and the second frequency-division control signal PLF are in corresponding inactive states, and the first gate control signals Nscan and the second gate control signals Pscan generated by the portion of the gate drive circuits GDC may be correspondingly controlled to have active pulses while the frequency-division control signal LF. the first frequency-division control signal NLF, and the second frequency-division control signal PLF are in corresponding active level states, therefore, by controlling the frequency-division control signal LF, the first frequency-division control signal NLF, and the second frequency-division control signal PLF to transition from the active level state to the inactive level state at different timings within different hold frames HF, it is possible to control the display region of the display panel to be divided into a plurality of sub-display regions having different frequencies, and to control the display panel to realize frequency-division at any position in the display region, thereby realizing the region-partition frequency-division control of the display region of the display panel.

The operation principle of the frequency-division display of the display panel during a display cycle will be explained by taking the following as an example: the sub-pixels are in the nth row; the first gate control signal Nscan(n−3) is received at the control terminal of the first reset transistor Ti1, the first gate control signal Nscan(n+1) is received at the control terminal of the compensation transistor Tc, the second gate control signal Pscan(n) is received at the control terminal of the data transistor Tda, the light-emitting control signal EMA is received by the light-emitting control transistor, the reset control signal EMB is received by the second reset transistor Ti2 and the third reset transistor Ti3, the compensation transistor Tc and the first reset transistor Ti1 are N-type transistors, and the data transistor Tda, the light-emitting control transistor, the second reset transistor Ti2 and the third reset transistor Ti3 are P-type transistors.

Wherein, in the write frame WF, in order to realize that the control terminal data of the plurality of drive transistors Tdr included in the display panel can be reset and updated, the frequency-division control signal LF, or the first frequency-division control signal NLF and the second frequency-division control signal PLF have an active level state, so that the gate drive unit can output, in multiple stages, the first gate control signals Nscan and the second gate control signals Pscan having active pulses within the write frame WF. Thus, in the write frame WF, each row of sub-pixels SpiPi correspondingly undergoes a first reset phase ta1, a second reset phase ta2, a data write phase ta3, a third reset phase ta4, and a light-emitting phase ta5, as shown in FIG. 6A.

In the first reset phase ta1, the (n−3)th-stage first gate control signal Nscan(n−3) has a high-level state, the nth-stage second gate control signal Pscan(n) has a high-level state, the (n+1)th-stage first gate control signal Nscan(n+1) has a low-level state, the reset control signal EMB has a high-level state, the light-emitting control signal EMA has a high-level state. The first reset transistor Ti1 is turned on, and the first reset signal Vi1 resets the potential of the control terminal of the drive transistor Tdr.

In the second reset phase ta2, the (n−3)th-stage first gate control signal Nscan(n−3) has a high-level state, the nth-stage second gate control signal Pscan(n) has a high-level state, the (n+1)th-stage first gate control signal Nscan(n+1) has a high-level state, the reset control signal EMB has a high-level state, the light-emitting control signal EMA has a high-level state. The first reset transistor Ti1 and the compensation transistor Tc are turned on so that the potentials of the output terminal and the control terminal of the drive transistor Tdr are reset in accordance with the first reset signal.

In the data write phase ta3, the (n−3)th-stage first gate control signal Nscan(n−3) has a low-level state, the nth-stage second gate control signal Pscan(n) has a low-level state, the (n+1)th-stage first gate control signal Nscan(n+1) has a high-level state, the reset control signal EMB has a high-level state, the light-emitting control signal EMA has a high-level state. The data transistor Tda and the compensation transistor Tc are turned on so that the control terminal of the drive transistor Tdr can be written information of the data signal.

In the third reset phase ta4, the (n−3)th-stage first gate control signal Nscan(n−3) has a low-level state, the nth-stage second gate control signal Pscan(n) has a high-level state, the (n+1)th-stage first gate control signal Nscan(n+1) has a low-level state, the reset control signal EMB has a low-level state, the light-emitting control signal EMA has a high-level state. The second reset transistor Ti2 and the third transistor T3 are turned on so that the anode of the light-emitting device Di is reset according to the second reset signal Vi2, and the input terminal of the drive transistor Tdr is reset according to the third reset signal Vi3.

In the light-emitting phase ta5, the (n−3)th-stage first gate control signal Nscan(n−3) has a low-level state, the nth-stage second gate control signal Pscan(n) has a high-level state, the (n+1)th-stage first gate control signal Nscan(n+1) has a low-level state, the reset control signal EMB has a high-level state, the light-emitting control signal EMA has a low-level state. The first light-emitting control transistor Te1 and the second light-emitting control transistor Ts1 are turned on according to the light-emitting control signal EMA so that the drive transistor Tdr generates a driving current to drive the corresponding light-emitting device Di to emit light.

And in the hold frame HF, the sub-pixels Spi of a portion of rows may display the same screen(s) as that displayed during the write frame WF. Therefore, the sub-pixels Spi corresponding to the portion of rows do not have to undergo the first reset phase ta1, the second reset phase ta2, or the data write phase ta3 again.

With continued reference to FIG. 6B, the gate drive circuit GDC included in the gate drive unit applied to the display panel employs the design as shown in FIGS. 2A-2C, in correspondence to a hold frame HF (for example, the first hold frame HF1), the frequency-division control signal LF correspondingly has a transition from the active level state to the inactive level state in the pth-stage gate drive circuit GDC(p) to the (p+q)th-stage gate drive circuit GDC(p+q) of the gate drive unit. Then, in combination with the analysis of FIG. 3A, it can be seen that the first gate control signals Nscan and the second gate control signals Pscan from multiple stages, which are outputted by the gate drive circuits GDC at multiple stages located before the pth-stage gate drive circuit GDC(p) and the pth-stage gate drive circuit GDC(p), each have active pulses, so that the data transistor (s) Tda and the compensation transistor(s) Tc in a number of sub-pixels Spi electrically connected to the gate drive circuits GDC at multiple stages located before the pth-stage gate drive circuit GDC(p) and in a number of sub-pixels Spi electrically connected to the pth-stage gate drive circuit GDC(p) can be both turned on in the corresponding time period(s) (for example, in the data write phase ta3 of the corresponding write frame WF), so that information of corresponding data signal(s) is transmitted to the control terminal(s) of the drive transistor(s) Tdr, thereby controlling variation of the driving current(s) generated by the drive transistor(s) Tdr, thereby realizing display update of the number of sub-pixels Spi electrically connected to the gate drive circuits GDC at multiple stages located before the pth-stage gate drive circuit GDC(p) and a number of sub-pixels Spi electrically connected to the pth-stage gate drive circuit GDC(p).

And because neither of the first gate control signals Nscan and the second gate control signals Pscan from multiple stages, which are outputted by the gate drive circuits GDC at multiple stages located after the (p+9)th-stage gate drive circuit GDC(p+9) and by the (p+9)th-stage gate drive circuit GDC(p+9), has an active pulse, therefore, the data transistor (s) Tda and the compensation transistor(s) Tc in a number of sub-pixels Spi electrically connected to the gate drive circuits GDC at multiple stages located after the (p+9)th-stage gate drive circuit GDC(p+9) and in a number of sub-pixels Spi electrically connected to the (p+9)th-stage gate drive circuit GDC(p+9) are not turned on in the hold frame HF. Thus, in the number of sub-pixels Spi electrically connected to the gate drive circuits GDC at multiple stages located after the (p+9)th-stage gate drive circuit GDC(p+9) and in the number of sub-pixels Spi electrically connected to the (p+9)th-stage gate drive circuit GDC(p+9), the control terminal(s) of the drive transistor(s) Tdr maintain(s) information written during the write frame WF, so that the number of sub-pixels Spi electrically connected to the gate drive circuits GDC at multiple stages located after the (p+9)th-stage gate drive circuit GDC(p+9) and the number of sub-pixels Spi electrically connected to the (p+9)th-stage gate drive circuit GDC(p+9) still display(s), in the hold frame HF, same content(s) as that displayed during the write frame WF.

For the situation in which the (p+1)th-stage first gate control signal Nscan(p+1) to the (p+8)th-stage first gate control signal Nscan(p+8) always maintain in the high-level states due to the change of level states of the corresponding frequency-division control signal LF, and the (p+1)th-stage second gate control signal Pscan(p+1) to the (p+8)th-stage second gate control signal Pscan(p+8) corresponds to the corresponding second clock signal CK, at least one of a central processing unit, a graphics processing unit, a timing controller, and the like may be utilized to control a number of sub-pixels Spi electrically connected to the (p+1)th-stage gate drive circuit GDC to the (p+8)th-stage gate drive circuit GDC(p+8) to display a fixed black screen, so as to address the display abnormality which is easily perceived and occurred with the number of sub-pixels Spi electrically connected to the (p+1)th-stage gate drive circuit GDC to the (p+8)th-stage gate drive circuit GDC(p+8).

With continued reference to FIG. 6C, the gate drive circuit GDC included in the gate drive unit applied to the display panel employs the design as shown in FIG. 2D, in correspondence to a hold frame HF (for example, the first hold frame HF1), the first frequency-division control signal NLF and the second frequency-division control signal PLF correspondingly have a transition from the active level state to the inactive level state in the pth-stage gate drive circuit GDC(p) to the (p+q)th-stage gate drive circuit GDC(p+q) of the gate drive unit. Then, in combination with the analysis of FIGS. 3B-3C, it can be seen that the first gate control signals Nscan and the second gate control signals Pscan from multiple stages, which are outputted by the gate drive circuits GDC at multiple stages located before the (p+11)th-stage gate drive circuit GDC(p+11), each have active pulses, so that the data transistor(s) Tda and the compensation transistor(s) Tc in a number of sub-pixels Spi electrically connected to the gate drive circuits GDC at multiple stages located before the (p+11)th-stage gate drive circuit GDC(p+11) can be both turned on in the corresponding time period(s) (for example, in the data write phase ta3 of the corresponding write frame WF), so that information of corresponding data signal(s) is transmitted to the control terminal(s) of the drive transistor(s) Tdr, thereby controlling variation of the driving current(s) generated by the drive transistor(s) Tdr, thereby realizing display update of the number of sub-pixels Spi electrically connected to the gate drive circuits GDC at multiple stages located before the (p+11)th-stage gate drive circuit GDC(p+11).

And because the first gate control signals Nscan from multiple stages, which are outputted by the gate drive circuits GDC at multiple stages located after the (p+10)th-stage gate drive circuit GDC(p+10) have no active pulses, and the second gate control signals Pscan from multiple stages, which are outputted by the gate drive circuits GDC at multiple stages located after the (p+11)th-stage gate drive circuit GDC(p+11) have no active pulses, therefore, in a number of sub-pixels Spi electrically connected to the gate drive circuits GDC at multiple stages located after the (p+10)th-stage gate drive circuit GDC(p+10), the data transistor(s) Tda are not turned on in the hold frame HF; and in a number of sub-pixels Spi electrically connected to the gate drive circuits GDC at multiple stages located after the (p+11)th-stage gate drive circuit GDC(p+11), the compensation transistor(s) Tc are not turned on in the hold frame HF The (p+10)th-stage second gate control signal Pscan(p+10) outputted by the (p+10)th-stage gate drive circuit GDC(p+10) has an active pulse, however, because the compensation transistor(s) Tc in a number of sub-pixels Spi electrically connected to the (p+10)th-stage gate drive circuit GDC(p+10) is turned off by receiving the (p+11)th-stage first gate control signal Nscan(p+11), and therefore, the control terminal(s) of the drive transistor(s) Tdr in the number of sub-pixels Spi electrically connected to the (p+10)th-stage gate drive circuit GDC(p+10) does not receive new data information in the hold frame HF.

If the first frequency-division control signal NLF transitions from the active level state to the inactive level state ahead of the second frequency-division control signal PLF, and the first reset transistor Ti1 and the compensation transistor Tc of the sub-pixel Spi are both controlled by the first gate control signal Nscan(e.g., the control terminal of the first reset transistor Ti1 located in the nth row is controlled by the (n−3)th-stage first gate control signal Nscan(n−3), and the control terminal of the compensation transistor Tc located in the nth row is controlled by the (n+1)th-stage first gate control signal Nscan(n+1)), then, in the hold frame HF, a number of sub-pixels Spi in a portion of rows of the display panel are controlled not to receive new data signal(s), but the first reset transistor(s) Ti1 of the number of sub-pixels Spi are controlled by the corresponding first gate control signal(s) Nscan to be turned on, resulting in the potential(s) of the control terminal(s) of the drive transistor(s) Tdr of the sub-pixels Spi of in the portion of rows being reset (for example, in the hold frame HF, the pth-stage first gate control signal Nscan(p) to the (p+10)th-stage first gate control signal Nscan(p+10) have active pulses to output, and the pth-stage second gate control signal Pscan to the (p+11)th-stage second gate control signal Pscan(p+11) have active pulses to output, then, the first reset transistors Ti1 located in the number of sub-pixels Spi in the (p+10)th-row to the (p+13) th-row are turned on by correspondingly receiving the (p+8)th-stage first gate control signal Nscan(p+8) to the (p+10)th-stage first gate control signal Nscan(p+10), enabling the reset of the potentials of the control terminals of the drive transistors Tdr of the number of sub-pixels Spi in the (p+10) th-row to the (p+13) th-row. However, since the compensation reset transistors in the number of sub-pixels Spi in the (p+10) th-row to the (p+13) th-row are turned off by correspondingly receiving the (p+11)th-stage first gate control signal Nscan(p+11) to the (p+14)th-stage first gate control signal Nscan(p+14), therefore, resetting the potentials of the control terminals of the drive transistors Tdr is realized by the number of sub-pixels Spi in the (p+10)th-row to the (p+13)th-row; but no new data information is stored in the control terminals of the drive transistors Tdr, and no original data signal is retained in the control terminals of the drive transistors Tdr). Thus, a display problem may incur.

To address the problem that the sub-pixels Spi in a portion of rows of the display panel do not receive new data signal(s) and the potentials of the control terminals of the drive transistors Tdr of the sub-pixels Spi in the portion of rows are reset in the hold frame HF, the second frequency-division control signal PLF may be controlled to transition from the active level state to the inactive level state ahead of the first frequency-division control signal NLF.

Therefore, when the display panel realizes the region-partition frequency-division display by using the gate drive circuit GDC shown in FIG. 2D, by controlling the relative timing of the first frequency-division control signal NLF and the second frequency-division control signal PLF transitioning from the active level states to the inactive level states, a number of sub-pixels Spi electrically connected to the gate drive circuits GDC at multiple stages located after the (p+11)th-stage gate drive circuit GDC(p+11) may display, in the hold frame HF, the same content(s) as in the write frame WF.

It will be appreciated that within each hold frame HF, the frequency-division control signal LF, the first frequency-division control signal NLF, and the second frequency-division control signal PLF are not limited to correspondingly transition from the active level states to the inactive level states in the pth-stage gate drive circuit GDC(p) to the (p+q)th-stage gate drive circuit GDC(p+q) of the gate drive unit. By controlling the frequency-division control signal LF, the first frequency-division control signal NLF, and the second frequency-division control signal PLF to transition from the active level states to the inactive level states in the gate drive circuits GDC at correspondingly different stages during different hold frames HF, the display region of the display panel may be divided into a plurality of sub-display regions having different refresh rates, thereby realizing the region-partition frequency-division setting of the display panel.

The principles and embodiments of the present disclosure have been elucidated with reference to specific examples, the description of which is merely intended to aid in the understanding of the method of the present disclosure and its core idea. At the same time, variations will occur to those skilled in the art in both the detailed description and the scope of application in accordance with the teachings of the present disclosure. In view of the foregoing, the present description should not be construed as limiting the application.

What is claimed is:

1. A gate drive unit, comprising a frequency-division control line and a plurality of cascaded gate drive circuits, the frequency-division control line being configured to transmit one or more frequency-division control signals to the plurality of gate drive circuits, each of the gate drive circuits comprising:

a first control module electrically connected to a first node of a current-stage gate drive circuit of the plurality of gate drive circuits and configured to control signal transmission between the first node and one of a first power supply terminal and a second power supply terminal according to a corresponding first clock signal and one of a first gate control signal outputted by a previous-stage gate drive circuit of the plurality of gate drive circuits and a start signal;

a first output module electrically connected to at least the first node of the current-stage gate drive circuit and configured to control an electrical connection between a third power supply terminal and a first output terminal of the current-stage gate drive circuit according to a potential of the first node, wherein the first output terminal outputs the first gate control signal of the current-stage gate drive circuit;

a second output module electrically connected to a second node of the current-stage gate drive circuit and a third node of the current-stage gate drive circuit, and configured to output a second gate control signal of the current-stage gate drive circuit according to a potential of the second node and a potential of the third node; and a frequency-division control module electrically connected to the first node of the current-stage gate drive circuit and configured to control signal transmission between the first power supply terminal and the first node or the second node according to the frequency-division control signal;

wherein the first control module comprises:

a first transistor having a first control terminal and a second control terminal configured to receive one of the first gate control signal outputted by the previous-stage gate drive circuit and the start signal, and an input terminal electrically connected to the first power supply terminal;

a second transistor having a control terminal electrically connected to the first control terminal of the first transistor, an input terminal electrically connected to the second power supply terminal, and an output terminal electrically connected to an output terminal of the first transistor; and a third transistor having a control terminal configured to receive the corresponding first clock signal, an input terminal electrically connected to the output terminal of the first transistor, and an output terminal electrically connected to the first node;

wherein the frequency-division control module is electrically connected to the first transistor or the third transistor.

2. The gate drive unit according to claim 1, wherein the frequency-division control module comprises:

a frequency-division transistor having a control terminal configured to receive the frequency-division control signal, an input terminal electrically connected to the output terminal of the third transistor, and an output terminal electrically connected to the first node.

3. The gate drive unit according to claim 1, wherein the frequency-division control module comprises:

a frequency-division transistor having a control terminal configured to receive the frequency-division control signal, an input terminal configured to receive the corresponding first clock signal, and an output terminal electrically connected to the control terminal of the third transistor.

4. The gate drive unit according to claim 1, wherein the frequency-division control module comprises:

a frequency-division transistor having a control terminal configured to receive the frequency-division control signal, an input terminal configured to receive the start signal or the first gate control signal outputted by the previous-stage gate drive circuit, and an output terminal electrically connected to the first control terminal of the first transistor.

5. The gate drive unit according to claim 1, wherein the first output module comprises a first output transistor and a second output transistor, a first control terminal and a second control terminal of the first output transistor and a control terminal of the second output transistor being electrically connected to the first node, an input terminal of the first output transistor being electrically connected to the third power supply terminal, an input terminal of the second output transistor being electrically connected to a fourth power supply terminal, and an output terminal of the second output transistor and an output terminal of the first output transistor being electrically connected to the first output terminal of the current-stage gate drive circuit;

the second output module comprises a third output transistor, a fourth output transistor and a storage capacitor, a control terminal of the third output transistor being electrically connected to the second node, an input terminal of the third output transistor being configured to receive a corresponding second clock signal, a control terminal of the fourth output transistor being electrically connected to the third node, an input terminal of the fourth output transistor being electrically connected to the second power supply terminal; an output terminal of the fourth output transistor and an output terminal of the third output transistor being electrically connected to a second output terminal of the current-stage gate drive circuit; a first terminal of the storage capacitor being electrically connected to the control terminal of the third output transistor, and a second terminal of the storage capacitor being electrically connected to the second output terminal of the current-stage gate drive circuit.

6. The gate drive unit according to claim 1, wherein the second node comprises a first sub-node and a second sub-node, and the frequency-division control signals comprise a first frequency-division control signal and a second frequency-division control signal; the frequency-division control module comprises:

a first frequency-division control module electrically connected to the first node and the first sub-node and configured to control signal transmission between the first power supply terminal and the first sub-node according to the first frequency-division control signal; and a second frequency-division control module electrically connected to the first node and the second sub-node and configured to control signal transmission between the first power supply terminal and the second sub-node according to the second frequency-division control signal;

wherein the first output module is electrically connected to the first sub-node, and the first output module is configured to output the first gate control signal of the current-stage gate drive circuit according to the potential of the first node and a potential of the first sub-node; the second output module is electrically connected to the second sub-node, and the second output module is configured to output the second gate control signal of the current-stage gate drive circuit according to a potential of the second sub-node and the potential of the third node.

7. The gate drive unit according to claim 6, wherein the first frequency-division control module comprises a first frequency-division transistor, a second frequency-division transistor, and a first capacitor, a control terminal of the first frequency-division transistor being electrically connected to the third node of the current-stage gate drive circuit, and an input terminal of the first frequency-division transistor being configured to receive the first frequency-division control signal; a control terminal of the second frequency-division transistor being electrically connected to an output terminal of the first frequency-division transistor, an input terminal of the second frequency-division transistor being electrically connected to the first node, and an output terminal of the second frequency-division transistor being electrically connected to the first sub-node; a first terminal of the first capacitor being electrically connected to the control terminal of the second frequency-division transistor, and a second terminal of the first capacitor being electrically connected to the first sub-node;

the second frequency-division control module comprises a third frequency-division transistor, a fourth frequency-division transistor, and a second capacitor, a control terminal of the third frequency-division transistor being electrically connected to the third node of the current-stage gate drive circuit, and an input terminal of the third frequency-division transistor being configured to receive the second frequency-division control signal; a control terminal of the fourth frequency-division transistor being electrically connected to an output terminal of the third frequency-division transistor, an input terminal of the fourth frequency-division transistor being electrically connected to the first node, and an output terminal of the fourth frequency-division transistor being electrically connected to the second sub-node; a first terminal of the second capacitor being electrically connected to the control terminal of the fourth frequency-division transistor, and a second terminal of the second capacitor being electrically connected to the second sub-node.

8. The gate drive unit according to claim 7, wherein the first output module comprises a first output transistor and a second output transistor, a first control terminal and a second control terminal of the first output transistor being electrically connected to the first node, an input terminal of the first output transistor being electrically connected to the third power supply terminal, a control terminal of the second output transistor being electrically connected to the first sub-node, an input terminal of the second output transistor being electrically connected to a fourth power supply terminal, and an output terminal of the second output transistor and an output terminal of the first output transistor being electrically connected to the first output terminal of the current-stage gate drive circuit;

the second output module comprises a third output transistor, a fourth output transistor and a storage capacitor, a control terminal of the third output transistor being electrically connected to the second sub-node, an input terminal of the third output transistor being configured to receive a corresponding second clock signal, a control terminal of the fourth output transistor being electrically connected to the third node, an input terminal of the fourth output transistor being electrically connected to the second power supply terminal, and an output terminal of the fourth output transistor and an output terminal of the third output transistor being electrically connected to a second output terminal of the current-stage gate drive circuit; a first terminal of the storage capacitor being electrically connected to the control terminal of the third output transistor, and a second terminal of the storage capacitor being electrically connected to the second output terminal of the current-stage gate drive circuit.

9. The gate drive unit according to claim 1, wherein the first control module further comprises a fourth transistor, a fifth transistor and a sixth transistor, a first control terminal and a second control terminal of the fourth transistor being configured to receive the corresponding first clock signal, an output terminal of the fourth transistor being electrically connected to the first node; a control terminal of the fifth transistor, a first control terminal and a second control terminal of the sixth transistor being electrically connected to the third node, an input terminal of the fifth transistor being electrically connected to the second power supply terminal, an output terminal of the fifth transistor being electrically connected to an input terminal of the fourth transistor, an input terminal of the sixth transistor being electrically connected to the third power supply terminal, and an output terminal of the sixth transistor being electrically connected to the first node;

the gate drive unit further comprises a seventh transistor and an eighth transistor, a first control terminal and a second control terminal of the seventh transistor being electrically connected to the first node, an input terminal of the seventh transistor being electrically connected to the first power supply terminal, an output terminal of the seventh transistor being electrically connected to the third node, a control terminal of the eighth transistor being electrically connected to the first node, an input terminal of the eighth transistor being electrically connected to the second power supply terminal, and an output terminal of the eighth transistor being electrically connected to the third node.

10. The gate drive unit according to claim 5, wherein the gate drive circuit further comprises:

a first switching transistor having an input terminal electrically connected to the first node;

a second switching transistor having an input terminal electrically connected to an output terminal of the first switching transistor, and an output terminal electrically connected to the second node; and a third capacitor having a first terminal electrically connected to a control terminal of the first switching transistor and a second terminal electrically connected to the output terminal of the first switching transistor;

wherein the control terminal of the first switching transistor of an nth-stage gate drive circuit of the plurality of gate drive circuits is configured to receive the first gate control signal outputted by an (n−10)th-stage gate drive circuit of the plurality of gate drive circuits, and the control terminal of the second switching transistor of the nth-stage gate drive circuit is configured to receive the first gate control signal outputted by an (n−2)th-stage gate drive circuit of the plurality of gate drive circuits.

11. The gate drive unit according to claim 8, wherein the gate drive circuit further comprises:

a ninth transistor having a first control terminal and a second control terminal configured to receive the corresponding first clock signal, and an output terminal electrically connected to the first sub-node;

a tenth transistor having a control terminal electrically connected to the third node of the current-stage gate drive circuit, an input terminal electrically connected to the second power supply terminal, and an output terminal electrically connected to an input terminal of the ninth transistor;

an eleventh transistor having a control terminal electrically connected to the third node of the previous-stage gate drive circuit, an input terminal electrically connected to the output terminal of the third frequency-division transistor, and an output terminal electrically connected to the second sub-node;

a twelfth transistor having a first control terminal and a second control terminal configured to receive the corresponding first clock signal, an output terminal electrically connected to the input terminal of the eleventh transistor;

a thirteenth transistor having a control terminal electrically connected to the third node of the current-stage gate drive circuit, an input terminal electrically connected to the second power supply terminal, and an output terminal electrically connected to an input terminal of the twelfth transistor.

12. A display device, comprising:

a gate drive unit and a display panel;

wherein the gate drive unit comprising a frequency-division control line and a plurality of cascaded gate drive circuits, the frequency-division control line being configured to transmit one or more frequency-division control signal to the plurality of gate drive circuits, each of the gate drive circuits comprising:

a first control module electrically connected to a first node of a current-stage gate drive circuit of the plurality of gate drive circuits and configured to control signal transmission between the first node and one of a first power supply terminal and a second power supply terminal according to a corresponding first clock signal and one of a first gate control signal outputted by a previous-stage gate drive circuit of the plurality of gate drive circuits and a start signal;

a first output module electrically connected to at least the first node of the current-stage gate drive circuit and configured to control an electrical connection between a third power supply terminal and a first output terminal of the current-stage gate drive circuit according to a potential of the first node, wherein the first output terminal outputs the first gate control signal of the current-stage gate drive circuit;

a second output module electrically connected to a second node of the current-stage gate drive circuit and a third node of the current-stage gate drive circuit, and configured to output a second gate control signal of the current-stage gate drive circuit according to a potential of the second node and a potential of the third node; and a frequency-division control module electrically connected to the first node of the current-stage gate drive circuit and configured to control signal transmission between the first power supply terminal and the first node or the second node according to the frequency-division control signal;

wherein the display panel comprising a plurality of sub-pixels, each of the sub-pixels comprising a light-emitting device and a pixel drive circuit configured to drive the light-emitting device to emit light, the pixel drive circuit comprising at least a drive transistor, a data transistor and a compensation transistor; the drive transistor being configured to drive the light-emitting device to emit light according to a corresponding data signal, an input terminal of the compensation transistor being electrically connected to an output terminal of the drive transistor, an output terminal of the compensation transistor being electrically connected to a control terminal of the drive transistor, an input terminal of the data transistor being configured to receive the corresponding data signal, and an output terminal of the data transistor being electrically connected to an input terminal of the drive transistor;

wherein a number of first gate control signals generated by the plurality of gate drive circuits are outputted to control terminals of the compensation transistors of the plurality of sub-pixels, and a number of second gate control signals generated by the plurality of gate drive circuits are outputted to control terminals of the data transistors of the plurality of sub-pixels; and wherein the control terminal of the data transistor of the sub-pixel located in an nth row receives an nth-stage second gate control signal outputted by an nth-stage gate drive circuit of the plurality of gate drive circuits; the control terminal of the compensation transistor of the sub-pixel located in the nth row receives an (n+1)

th-stage first gate control signal outputted by an (n+1) th-stage gate drive circuit of the plurality of gate drive circuits.

13. The display device according to claim 12, wherein the pixel drive circuit comprises a first reset transistor having an input terminal configured to receive a first reset signal, and an output terminal electrically connected to the control terminal of the drive transistor;

wherein the first gate control signals generated by the plurality of gate drive circuits are outputted to control terminals of the first reset transistors of the plurality of sub-pixels; and for each sub-pixel, the first gate control signal received at the control terminal of the first reset transistor and the first gate control signal received at the control terminal of the compensation transistor are provided by the gate drive circuits at different stages.

14. The display device according to claim 13, wherein the control terminal of the first reset transistor of the sub-pixel located in an nth row receives an (n−3)th-stage first gate control signal outputted by an (n−3)th-stage gate drive circuit of the plurality of gate drive circuits; the control terminal of the compensation transistor of the sub-pixel located in the nth row receives an (n+1)th-stage first gate control signal outputted by an (n+1)th-stage gate drive circuit of the plurality of gate drive circuits.

15. The display device according to claim 12, wherein each of the pixel drive circuits further comprises:

a second reset transistor having a control terminal configured to receive a reset control signal, an input terminal configured to receive a second reset signal, and an output terminal electrically connected to an anode of the light-emitting device;

a first light-emitting control transistor having a control terminal configured to receive a light-emitting control signal, an input terminal and an output terminal electrically connected between the first power supply terminal and the input terminal of the drive transistor;

a second light-emitting control transistor having a control terminal configured to receive the light-emitting control signal, an input terminal and an output terminal electrically connected between the light-emitting device and the output terminal of the drive transistor; and a fourth capacitor connected in series between the first power supply terminal and the control terminal of the drive transistor.

16. The display device according to claim 15, wherein each of the pixel drive circuits further comprises:

a third reset transistor having a control terminal configured to receive the reset control signal, an input terminal configured to receive a third reset signal, and an output terminal electrically connected to the input terminal of the drive transistor; and a fifth capacitor connected in series between the control terminal of the drive transistor and the control terminal of the data transistor.

* * * * *